(12) United States Patent
Zhu et al.

(10) Patent No.: US 9,516,557 B2
(45) Date of Patent: Dec. 6, 2016

(54) DIFFERENTIATED VOLTE BASED ON DUAL RADIO AND DRVCC

(71) Applicant: QUALCOMM Incorporated, San Diego, CA (US)

(72) Inventors: Xipeng Zhu, Beijing (CN); Yan Li, Beijing (CN); Jun Wang, Poway, CA (US); Roozbeh Atarius, San Diego, CA (US); Arvind Vardarajan Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 14/502,542

(22) Filed: Sep. 30, 2014

(65) Prior Publication Data

US 2015/0131619 A1    May 14, 2015

Related U.S. Application Data

(63) Continuation-in-part of application No. PCT/CN2013/087138, filed on Nov. 14, 2013.

(51) Int. Cl.
*H04W 36/00* (2009.01)
*H04W 88/08* (2009.01)
(Continued)

(52) U.S. Cl.
CPC ..... *H04W 36/0022* (2013.01); *H04W 36/0027* (2013.01); *H04W 36/30* (2013.01); *H04W 88/06* (2013.01)

(58) Field of Classification Search
CPC ..... H04W 88/08; H04W 36/0022; H04W 8/08
(Continued)

(56) References Cited

U.S. PATENT DOCUMENTS 6,389,005 B1 * 5/2002 Cruickshank ....... H04L 12/2856
370/352
2007/0123259 A1 * 5/2007 Huang ................. H04W 36/18
455/436
(Continued)

FOREIGN PATENT DOCUMENTS

CN    101938796 A    1/2011
CN    102215478 A    10/2011
(Continued)

OTHER PUBLICATIONS

SONLte: "VoLTE: Voice, Text etc services over LTE," Feb. 15, 2010, 5 pages.
(Continued)

*Primary Examiner* — Ronald B Abelson
(74) *Attorney, Agent, or Firm* — The Marbury Law Group, PLLC

(57) ABSTRACT

Various embodiments provide methods and apparatus for network-controlled DRVCC. In an embodiment method, a wireless user equipment may include requesting handover of a voice over Internet protocol (VoIP) call from a first network to a second network, activating a second radio, continuing the voice call on the circuit switched (CS) domain of the second network, and communicating data for applications other than the voice call via the first network. An embodiment method may include determining whether the first network supports voice-over-LTE (VoLTE) calls, and deactivating a radio in response to determining that the first network supports VoLTE calls. An embodiment method may include determining whether a quality of the VoIP call satisfies a quality threshold, deactivating the radio continued to the second network when the quality of the VoIP call satisfies the quality threshold, and activating the second radio when the VoIP call quality does not satisfy the quality threshold.

18 Claims, 15 Drawing Sheets

(51) Int. Cl.
  *H04W 8/08* (2009.01)
  *H04W 36/30* (2009.01)
  *H04W 88/06* (2009.01)

(58) Field of Classification Search
  USPC ................................. 370/331, 332, 352–356
  See application file for complete search history.

(56) References Cited

U.S. PATENT DOCUMENTS

| | | | | |
|---|---|---|---|---|
| 2008/0026760 A1* | 1/2008 | Park | ................... | H04W 36/0055 455/437 |
| 2010/0278141 A1* | 11/2010 | Choi-Grogan | .... | H04W 36/0083 370/331 |
| 2011/0009120 A1* | 1/2011 | You | ................... | H04W 36/0022 455/436 |
| 2011/0158121 A1* | 6/2011 | Casati | ............... | H04W 36/0022 370/252 |
| 2012/0099586 A1* | 4/2012 | Cherian | ............ | H04L 29/12216 370/389 |
| 2012/0202556 A1* | 8/2012 | Mori | ..................... | H04W 36/30 455/525 |
| 2013/0107859 A1* | 5/2013 | Shi | ......................... | H04W 36/18 370/331 |
| 2013/0272194 A1 | 10/2013 | Keller et al. | | |
| 2014/0098787 A1* | 4/2014 | Kim | .................. | H04W 36/0022 370/331 |
| 2014/0162661 A1 | 6/2014 | Shaw et al. | | |
| 2014/0176659 A1* | 6/2014 | Khay-Ibbat | ............ | H04N 7/148 348/14.02 |
| 2014/0204901 A1 | 7/2014 | Hedman et al. | | |

FOREIGN PATENT DOCUMENTS

CN          103348736 A       10/2013
WO         2014134916 A1      9/2014

OTHER PUBLICATIONS

International Search Report and Written Opinion—PCT/CN2013/087138—ISA/EPO—Aug. 13, 2014.

* cited by examiner

DIFFERENTIATED VOLTE BASED ON DUAL RADIO AND DRVCC

RELATED APPLICATIONS

This application is a continuation-in-part of PCT/CN2013/087138, entitled "Dual Radio Voice Call Continuity" filed on Nov. 14, 2013, the entire contents of which are hereby incorporated herein by reference.

FIELD

Various embodiments relate generally to wireless communication systems, and more particularly, continuity of wireless communications in radio access networks.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with China's existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

Various embodiments provide methods, devices, and non-transitory processor-readable storage media for wireless communications by a user equipment (UE).

Some embodiment methods may include requesting handover of a voice over Internet protocol (VoIP) call from a network of a first radio access technology (RAT) to a network of a second RAT, activating a radio of the second RAT, continuing the VoIP call as a voice call on a circuit-switched (CS) domain of the network of the second RAT network, and communicating data for applications other than the VoIP call via the network of the first RAT.

Some embodiment methods may include resuming or continuing packet-switched (PS) services via the network of the first RAT.

Some embodiment methods may include handing over the VoIP call from the network of the first RAT to the CS domain of the network of the second RAT without disconnecting from the network of the first RAT.

In some embodiments, the UE may include two or more radios, and activating a radio of the second RAT may include activating a deactivated radio.

Some embodiment methods may include determining whether dual transmission mode (DTM) is supported by the UE or the network of the second RAT, after performing single radio voice call continuity, initiating a Tracking Area Update on the first RAT to resume PS service in response to determining that DTM is not supported by the UE or the network of the second RAT, and transferring a PS domain back to the first RAT in response to determining that DTM is supported by both the UE and the network of the second RAT.

Some embodiment methods may include sending an indication of network-controlled dual radio voice call continuity (DRVCC) capability.

Some embodiment methods may include receiving a command from the network of the first RAT to perform DRVCC, requesting a new CS connection via the network of the second RAT to perform DRVCC, and receiving a bearer deactivation request for the VoIP call on the network of the first RAT.

In some embodiments, an indication of network-controlled DRVCC capability may be delivered to a mobility management entity (MME), and the command to perform DRVCC may originate in the MME.

In some embodiments, an indication of network-controlled DRVCC capability may be delivered to a base station, and the command to perform DRVCC may originate in the base station.

Some embodiment methods may include receiving an indication to handover to the network of the second RAT, and the indication may further indicate that the UE should maintain a connection to the network of the first RAT.

Some embodiment methods may include determining whether the network of the first RAT supports voice-over-LTE (VoLTE) calls and deactivating the radio of the second RAT in response to determining that the network of the first RAT supports VoLTE calls.

Some embodiment methods may include determining whether one or more conditions have been satisfied and deactivating the radio of the second RAT in response to determining that at least one of the conditions has been satisfied. In some embodiments, the conditions may include that a radio of the first RAT has successfully performed a Session Initiation Protocol registration to an Internet Protocol Multimedia Subsystem (IMS) of the network of the first RAT, that the network of the first RAT supports at least one of Short-Message-Service (SMS) over IMS and SMS over SGs, and that the network of the first RAT supports circuit-switch-fall-back operations Some embodiment methods may include determining whether a quality of the VoIP call satisfies a minimum quality threshold, deactivating the radio of the second RAT in response to determining that the quality of the VoIP call satisfies the minimum quality threshold, and activating the radio of the second RAT in response to determining that the quality of the VoIP call does not satisfy the minimum quality threshold.

Some embodiment methods may include determining whether the VoIP call is likely to be at least one of downgraded and dropped, determining whether the network of the first RAT has initiated single radio voice call continuity (SRVCC) for the UE, and implementing dual radio voice call continuity (DRVCC) in response to determining that the VoIP call is likely to be at least one of downgraded and dropped and in response to determining that the network of the first RAT has not initiated SRVCC.

Various embodiments may include a mobile communication device or UE configured with processor-executable instructions to perform operations of the methods described above.

Various embodiments may include a mobile communication device or UE having means for performing functions of the operations of the methods described above.

Various embodiments may include non-transitory processor-readable media on which are stored processor-executable instructions configured to cause a processor of a mobile communication device or UE to perform operations of the methods described above.

Various embodiments provide methods, devices, and non-transitory processor-readable storage media for wireless communications by a base station of a first RAT network. Some embodiment methods may include sending a request to handover a voice call to a second RAT network, receiving a failure message in response to the request to handover, and receiving a bearer deactivation request for the voice call.

Some embodiment methods may include receiving an indication of network-controlled DRVCC capability from a UE, receiving a request to handover a voice call to a second RAT network from the UE, sending a message to the UE requesting the UE to perform voice call continuity, and receiving a bearer deactivation request for the voice call.

Some embodiment methods may include indicating that the UE has network-controlled DRVCC capability to a MME.

In some embodiments, the message to the UE may indicate that the UE should maintain a connection to the first RAT network.

Various embodiments may include a base station configured with processor-executable instructions to perform operations of the methods described above.

Various embodiments may include a base station having means for performing functions of the operations of the methods described above.

Various embodiments may include non-transitory processor-readable media on which are stored processor-executable instructions configured to cause a processor of a base station to perform operations of the methods described above.

Various embodiments provide methods, devices, and non-transitory processor-readable storage media for wireless communications by a MME.

Some embodiment methods may include receiving an indication that a UE has network controlled DRVCC capability, receiving a request to handover a voice call for the UE from a first RAT network to a second RAT network, and not releasing an S1 connection after the handover.

In some embodiments, the indication that the UE has network-controlled DRVCC may be received from a base station.

In some embodiments, the indication that the UE has network-controlled DRVCC may be received from the UE.

Various embodiments may include an MME configured with processor-executable instructions to perform operations of the methods described above.

Various embodiments may include an MME having means for performing functions of the operations of the methods described above.

Various embodiments may include non-transitory processor-readable media on which are stored processor-executable instructions configured to cause a processor of an MME to perform operations of the methods described above.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

As used herein, the terms "UE," "user equipment," "wireless device," "mobile communication device," "multi-radio communication device," "multi-radio UE," and related terms are used interchangeably and refer to any one or all of cellular telephones, smart phones, personal or mobile multimedia players, personal data assistants, laptop computers, personal computers, tablet computers, smart books, palm-top computers, wireless electronic mail receivers, multimedia Internet-enabled cellular telephones, wireless gaming controllers, and similar personal electronic devices that include a programmable processor, memory, and circuitry for utilizing two or more RF resources/radios. The various aspects may be useful in mobile communication devices, such as smart phones, and so such devices are referred to in the descriptions of various embodiments. However, the embodiments may be useful in any electronic devices, such as a dual-Subscriber-Identity-Module (dual-SIM), dual-active communication device that may individually maintain a plurality of subscriptions that utilize a plurality of separate RF resources/radios.

Various embodiments include methods and multi-radio communication devices implementing such methods that enable improved performance and power savings on the multi-radio device during a VoLTE call requesting handover of a voice over Internet protocol (VoIP) call from a first radio access technology (RAT) network to a second RAT network to maintain a call on a circuit switch (CS) network. Various embodiments further include selectively enabling and/or disabling a second radio (e.g., a radio supporting a subscription to a CS legacy network, such as a GSM network) based on the status/condition of a VoLTE call being handled by a first radio (e.g., a radio supporting a subscription to an LTE network).

Figure 1:
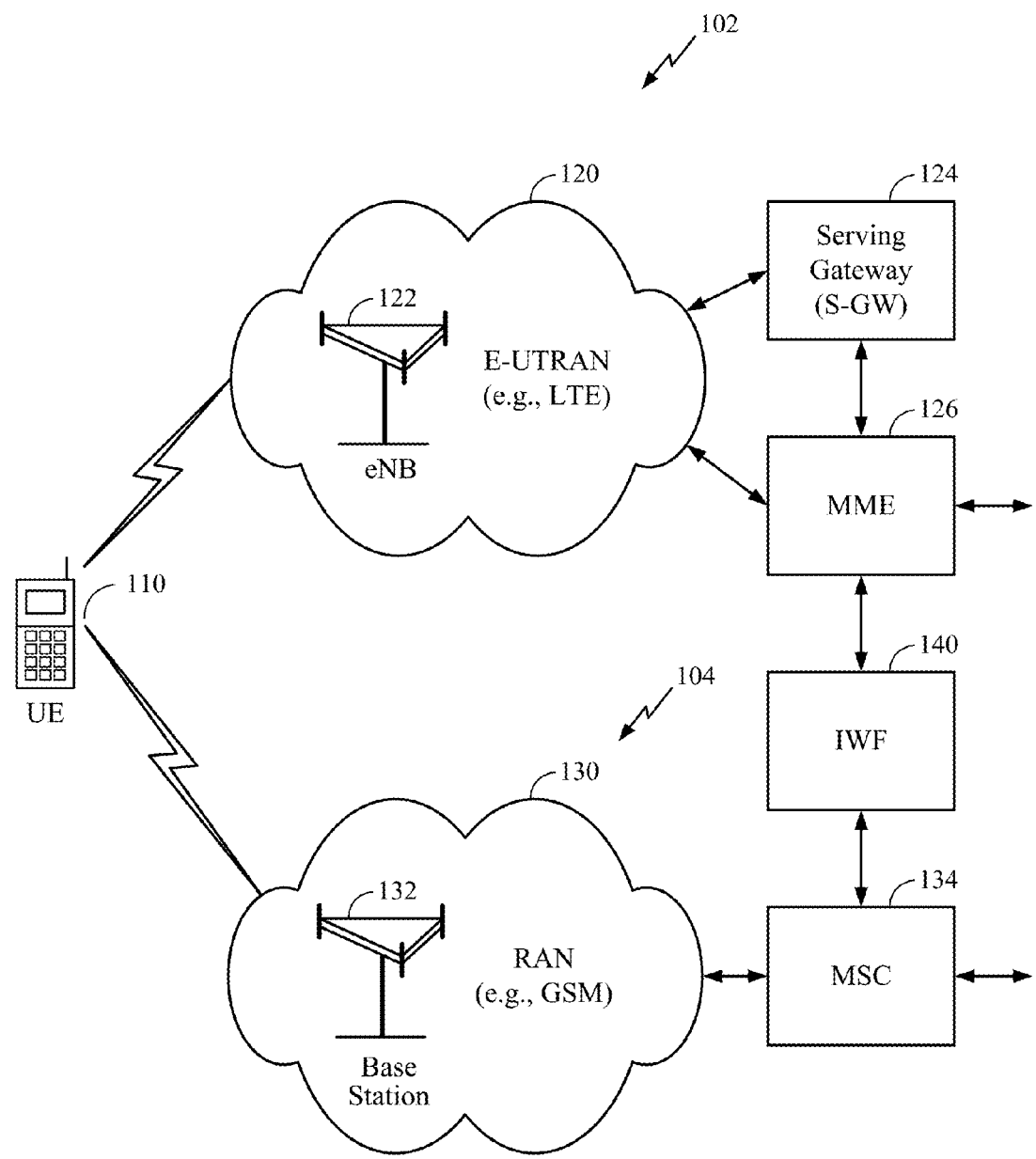
FIG. 1 is a telecommunications system block diagram of multiple wireless radio access technologies (RATs) suitable for use with various embodiments.

FIG. 1 illustrates a deployment in which multiple wireless networks have overlapping coverage. An evolved universal terrestrial radio access network (E-UTRAN) 120 may support LTE and may include a number of evolved Node Bs (eNBs) 122 and other network entities that can support wireless communication for user equipments (UEs), such as a multi-radio UE 110. Each eNB 122 may provide communication coverage for a particular geographic area. The term "cell" can refer to a coverage area of an eNB and/or an eNB subsystem serving this coverage area. A serving gateway (S-GW) 124 may communicate with the E-UTRAN 120 and may perform various functions such as packet routing and forwarding, mobility anchoring, packet buffering, initiation of network-triggered services, etc. A mobility management entity (MME) 126 may communicate with the E-UTRAN 120 and the serving gateway 124 and may perform various functions such as mobility management, bearer management, distribution of paging messages, security control, authentication, gateway selection, etc. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

A radio access network (RAN) 130 may support GSM and may include a number of base stations 132 and other network entities that can support wireless communication for UEs. A mobile switching center (MSC) 134 may communicate with the RAN 130 and may support voice services, provide routing for circuit-switched calls, and perform mobility management for UEs located within the area served by the MSC 134. Optionally, an inter-working function (IWF) 140 may facilitate communication between the MME 126 and the MSC 134 (e.g., for 1xCSFB).

The E-UTRAN 120, the serving gateway 124, and the MME 126 may be part of an LTE network 102. The RAN 130 and the MSC 134 may be part of a GSM network 104. For simplicity, FIG. 1 shows only some network entities in the LTE network 102 and the GSM network 104. The LTE and GSM networks may also include other network entities that may support various functions and services.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs.

The multi-radio UE 110 may be stationary or mobile and may also be referred to as a mobile station, a terminal, an access terminal, a subscriber unit, a station, etc. The multi-radio UE 110 may be a cellular phone, a personal digital assistant (PDA), a wireless modem, a wireless communication device, a handheld device, a laptop computer, a cordless phone, a wireless local loop (WLL) station, etc.

Upon power up, the multi-radio UE 110 may search for wireless networks from which the multi-radio UE 110 can receive communication services. If more than one wireless network is detected, then a wireless network with the highest priority may be selected to serve the multi-radio UE 110 and may be referred to as the serving network. The multi-radio UE 110 may perform registration with the serving network, if necessary. The multi-radio UE 110 may then operate in a connected mode to actively communicate with the serving network. Alternatively, the multi-radio UE 110 may operate in an idle mode and camp on the serving network if active communication is not required by the multi-radio UE 110.

Figure 2:
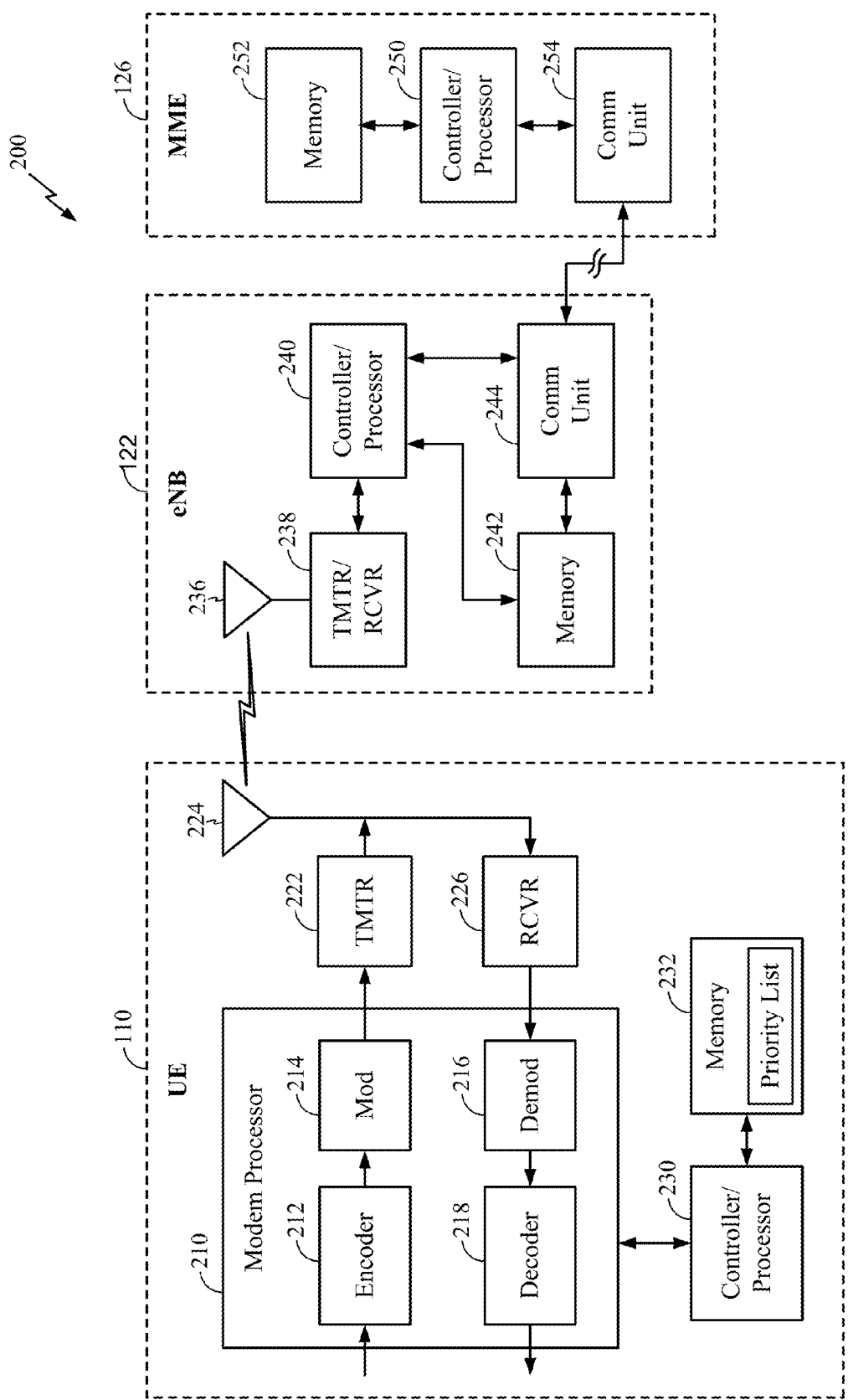
FIG. 2 is a component system diagram of a user equipment (UE), an evolved NodeB (eNB), and a mobility management entity (MME) in communication according to various embodiments.

FIG. 2 illustrates a block diagram 200 of a design of the multi-radio UE 110, the eNB 122, and the MME 126 of FIG. 1, according to some embodiments. With reference to FIGS. 1-2, on the multi-radio UE 110, an encoder 212 may receive traffic data and signaling messages to be sent on the uplink. The encoder 212 may process (e.g., format, encode, and interleave) the traffic data and signaling messages. A modulator (Mod) 214 may further process (e.g., symbol map and modulate) the encoded traffic data and signaling messages and provide output samples. A transmitter (TMTR) 222 may condition (e.g., convert to analog, filter, amplify, and frequency upconvert) the output samples and generate an uplink signal, which may be transmitted via an antenna 224 to the eNB 122.

On the downlink, the antenna 224 may receive downlink signals transmitted by the eNB 122 and/or other eNBs/base stations. A receiver (RCVR) 226 may condition (e.g., filter, amplify, frequency downconvert, and digitize) the received signal from the antenna 224 and may provide input samples. A demodulator (Demod) 216 may process (e.g., demodulate) the input samples and provide symbol estimates. A decoder 218 may process (e.g., deinterleave and decode) the symbol estimates and provide decoded data and signaling messages sent to the multi-radio UE 110. The encoder 212, the modulator 214, the demodulator 216, and the decoder 218 may be implemented by a modem processor 210. These units may perform processing in accordance with the RAT (e.g., LTE, 1xRTT, etc.) used by the wireless network with which the multi-radio UE 110 is in communication.

A controller/processor 230 may direct the operation of the multi-radio UE 110. The controller/processor 230 may also perform or direct other processes for the techniques described herein. The controller/processor 230 may also perform or direct the processing by the multi-radio UE 110. Memory 232 may store program codes and data for the multi-radio UE 110. The memory 232 may also store a priority list and configuration information.

On the eNB 122, a transmitter/receiver 238 may support radio communication with the multi-radio UE 110 and other UEs. A controller/processor 240 may perform various functions for communication with the UEs. On the uplink, the uplink signal from the multi-radio UE 110 may be received via an antenna 236, conditioned by a receiver/transmitter (TMTR/RCVR) 238, and further processed by the controller/processor 240 to recover the traffic data and signaling messages sent by the multi-radio UE 110. On the downlink, traffic data and signaling messages may be processed by the controller/processor 240 and conditioned by the TMTR/RCVR 238 to generate a downlink signal, which may be transmitted via the antenna 236 to the multi-radio UE 110 and other UEs. The controller/processor 240 may also perform or direct other processes for the techniques described herein. The controller/processor 240 may also perform or direct the processing by the eNB 122. Memory 242 may store program codes and data for the eNB 122. A communication (Comm) unit 244 may support communication with the MME 126 and/or other network entities.

At the MME 126, a controller/processor 250 may perform various functions to support communication services for UEs. The controller/processor 250 may also perform or direct the processing by the MME 126 (see, e.g., FIGS. 3-4). Memory 252 may store program codes and data for the MME 126. A communication unit 254 may support communication with other network entities (e.g., the eNB 122).

The block diagram 200 is a simplified design of the multi-radio UE 110, the eNB 122, and the MME 126. However, in some embodiments, each of the multi-radio UE 110, the eNB 122, and the MME 126 may include any number of transmitters, receivers, processors, controllers, memories, communication units, etc. Other network entities may also be implemented in similar manner.

Figure 3:
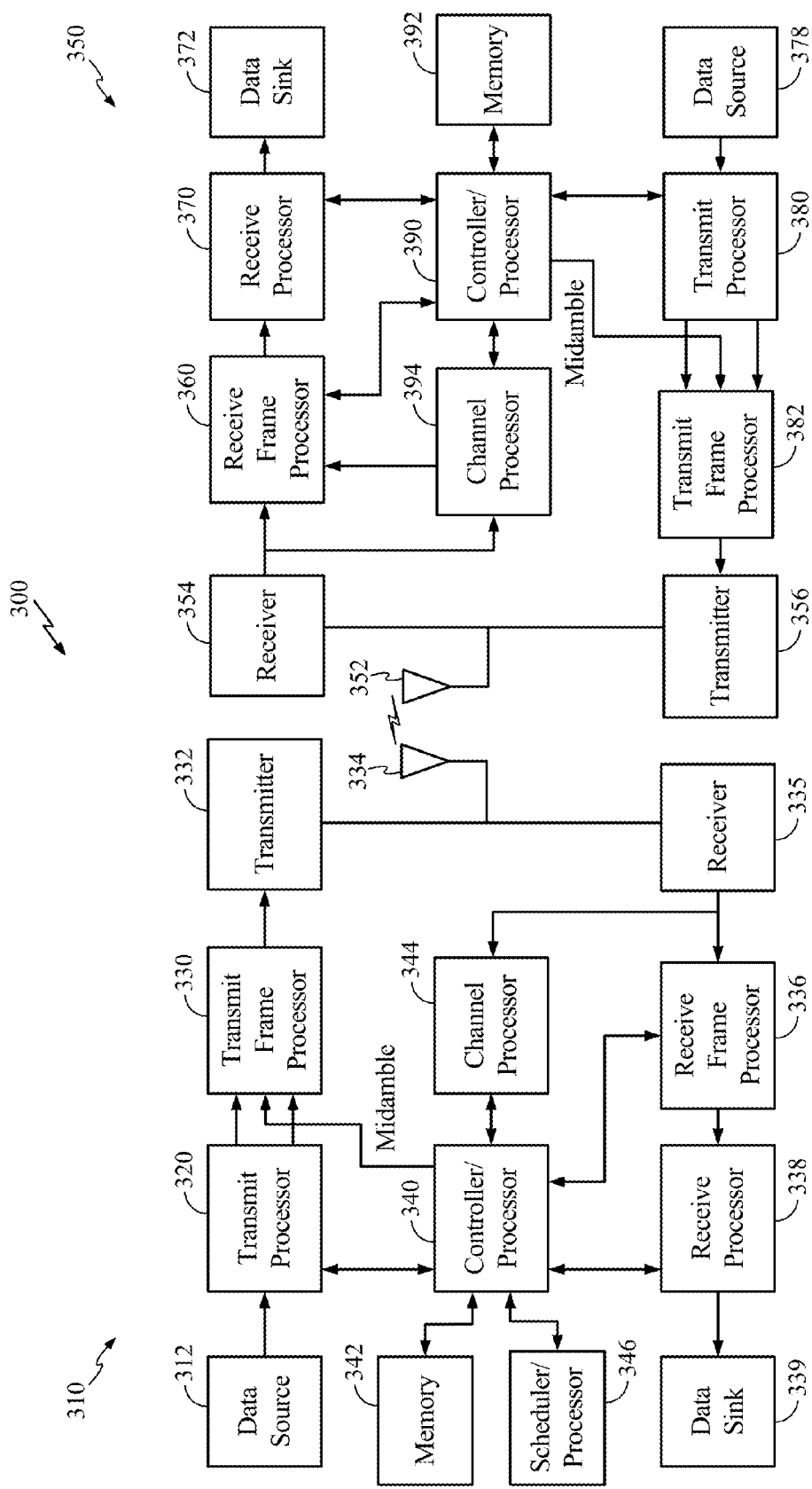
FIG. 3 is a block system diagram of an evolved NodeB in communication with a user equipment (UE) in a telecommunications system according to various embodiments.

FIG. 3 is a block diagram of an evolved NodeB (eNB) 310 in communication with a UE 350 in a RAN 300 according to some embodiments. In some embodiments, the RAN 300 may be similar to the E-UTRAN 120 of FIG. 1, the eNB 310 may be similar to the NodeB 122, and the UE 350 may be similar to the multi-radio UE 110. With reference to FIGS. 1-3, in a downlink communication, a transmit processor 320 may receive data from a data source 312 and may control signals from a controller/processor 340. The transmit processor 320 may provide various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by the controller/processor 340 to determine the coding, modulation, spreading, and/or scrambling schemes for the transmit processor 320. These channel estimates may be derived from a reference signal transmitted by the UE 350 or from feedback contained in a midamble from the UE 350. The symbols generated by the transmit processor 320 are provided to a transmit frame processor 330 to create a frame structure. The transmit frame processor 330 may create this frame structure by multiplexing the symbols with a midamble from the controller/processor 340, resulting in a series of frames. The frames may be provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 may receive the downlink transmission through an antenna 352 and may process the transmission to recover the information modulated onto the carrier. The information recovered by the receiver 354 may be provided to a receive frame processor 360, which parses each frame, and provides a midamble to a channel processor 394 and the data, control, and reference signals to a receive processor 370. The receive processor 370 may perform the inverse of the processing performed by the transmit processor 320 in the Node B 310. More specifically, the receive processor 370 may descramble and despread the symbols, and then may determine the most likely signal constellation points transmitted by the Node B 310 based on the modulation scheme. These soft decisions may be based on channel estimates computed by the channel processor 394. The soft decisions may be decoded and deinterleaved to recover the data, control, and reference signals. The CRC codes may be checked to determine whether the frames were successfully decoded. The data carried by the successfully decoded frames may be provided to a data sink 372, which represents applications running in the UE 350 and/or various user interfaces (e.g., display). Control signals carried by successfully decoded frames may be provided to a controller/processor 390. When frames are unsuccessfully decoded by the receiver processor 370, the controller/processor 390 may use an acknowledgement (ACK) and/or negative acknowledgement (NACK) protocol to support retransmission requests for those frames.

In the uplink, data from a data source 378 and control signals from the controller/processor 390 may be provided to a transmit processor 380. The data source 378 may represent applications running in the UE 350 and various user interfaces (e.g., keyboard). Similar to the functionality described in connection with the downlink transmission by the Node B 310, the transmit processor 380 may provide various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310 may be used to select the appropriate coding, modulation, spreading, and/or scrambling schemes. The symbols produced by the transmit processor 380 may be provided to a transmit frame processor 382 to create a frame structure. The transmit frame processor 382 may create this frame structure by multiplexing the symbols with a midamble from the controller/processor 390, resulting in a series of frames. The frames may be provided to a transmitter 356, which provides various signal conditioning functions including amplification, filtering, and modulating the frames onto a carrier for uplink transmission over the wireless medium through the antenna 352.

The uplink transmission may be processed at the Node B 310 in a manner similar to that described in connection with the receiver function at the UE 350. A receiver 335 may receive the uplink transmission through the antennas 334 and may process the transmission to recover the information modulated onto the carrier. The information recovered by the receiver 335 may be provided to a receive frame processor 336, which parses each frame, and provides a midamble to the channel processor 344 and the data, control, and reference signals to a receive processor 338. The receive processor 338 may perform the inverse of the processing performed by the transmit processor 380 in the UE 350. The data and control signals carried by the successfully decoded frames may be provided to a data sink 339 and the controller/processor, respectively. If some of the frames were unsuccessfully decoded by the receive processor, the controller/processor 340 may use an acknowledgement (ACK) and/or negative acknowledgement (NACK) protocol to support retransmission requests for those frames.

The controllers/processors 340 and 390 may be used to direct the operation at the Node B 310 and the UE 350, respectively. For example, the controllers/processors 340 and 390 may provide various functions including timing, peripheral interfaces, voltage regulation, power management, and other control functions. The computer-readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

According to some embodiments, the controller/processor 390 of the UE 350 may take measurements in a second RAN while on a voice call in a first RAN.

Multi-radio UEs, including simultaneous GSM and LTE (SGLTE) and simultaneous voice and LTE (SVLTE) UEs, are popular in the networks of some operators that do not support UMTS/WCDMA. As described, such multi-radio UEs may be capable of supporting simultaneous communications with two or more networks (e.g., an LTE network and a GSM network).

Voice over LTE (VoLTE) is a target of LTE voice solution evolution, and the handling of voice traffic on LTE handsets is evolving as the mobile industry infrastructure evolves toward higher—eventually ubiquitous—LTE availability. Because of the potential of high-quality service provided by LTE networks, migration of circuit-switched (CS) voice calls on legacy CS networks to voice-over-LTE calls (i.e., "VoLTE" calls) on an LTE network may be desirable. However, in many cases, LTE networks have expanded gradually, and as a result, LTE networks and the VoLTE services built on top of the LTE networks must be able to coexist with legacy CS networks and must be able to ensure handover to the legacy CS network when LTE coverage is insufficient.

Single radio voice call continuity (SRVCC) is a key component of successfully enabling VoLTE because SRVCC enables a multi-radio UE to handover a VoLTE call from a first radio that supports a subscription to the LTE network to a second radio that supports a subscription to a legacy CS network (e.g., GSM) while continuing the voice call uninterrupted. In other words, due to the spotty nature of LTE networks or factors such as network loading and/or loss of coverage, the VoLTE call may be transferred to a legacy CS network to enable the mobile communication device to continue the call when the VoLTE call would otherwise be dropped or downgraded, such as when the mobile communication device moves outside of an area supported by an LTE network. Currently, SRVCC may require an interworking function between a mobile switching center (MSC) and mobility management entity (MME).

Multi-radio UEs may be particularly well suited to take advantage of SRVCC capabilities because multi-radio UEs are able to make a CS connection for the voice call with a second radio before breaking the LTE voice connection handled by a first radio (i.e., a "make-before-break" capability), thereby improving the overall call reliability of the multi-radio UE. Such operations to implement voice call continuity (VCC) using multiple radios to implement "make-before-break" call transfers are herein referred to as dual-radio VCC (DRVCC).

Currently, a network that supports SRVCC typically assumes that UEs subscribed to the network are single-radio devices. Thus, a multi-radio UE may implement SRVCC by performing operations similar to those operations performed by a single-radio UE to implement SRVCC. However, in some embodiments, the multi-radio UE may utilize its multiple radios while performing SRVCC to achieve an overall improved performance over the performance associated with conventional single-radio-implementations of SRVCC.

Figure 4:
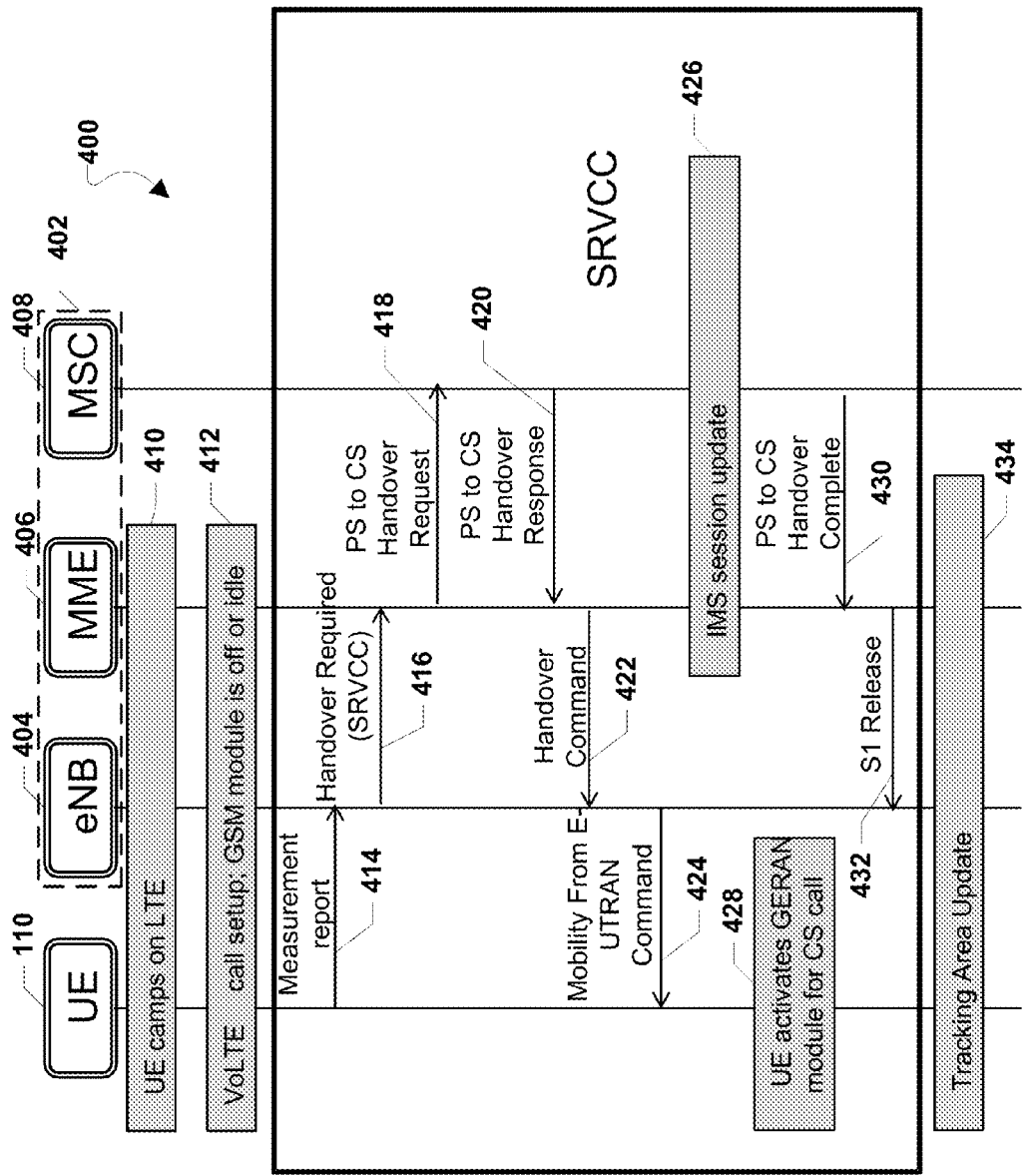
FIG. 4 is a signaling and call flow diagram illustrating communications exchanged between a UE and components in a network for implementing single radio voice call continuity (SRVCC), according to various embodiments.

FIG. 4 is a signaling and call flow diagram 400 illustrating communications exchanged between a multi-radio UE (e.g., the multi-radio UE 110 of FIGS. 1-2) and a network 402 for implementing SRVCC on the multi-radio UE 110, according to some embodiments.

With reference to FIGS. 1-4, the multi-radio UE 110 may camp on an LTE network in operation 410, such as by sending typical communications via a first radio module (e.g., an LTE radio module) to one or more components of the network 402, such as a serving base station (labeled in FIG. 4 as "eNB 404") and/or an MME 406. In some embodiments, the multi-radio UE 110 may selectively disable a second radio module (e.g., a radio supporting a subscription to a GSM network) to save power in response to determining that the first radio module is in communication with a network that supports VoLTE. In such embodiments, while the first radio module has access to a network that supports VoLTE calls, the multi-radio UE 110 may favor the potentially higher quality of VoLTE calls using the first radio module over CS voice calls conducted via the second radio module (e.g., before a VoLTE call starts). Thus, the multi-radio UE 110 may disable/deactivate the second radio module while VoLTE calls are possible in order to reduce the overall amount of power used on the multi-radio UE 110 (see, e.g., FIG. 14).

The multi-radio UE 110 may setup a VoLTE call with the network 402 in operation 412. In some embodiments, in response to setting up a VoLTE call, the multi-radio UE 110 may reactivate/enable the second radio in anticipation of having to perform SRVCC, such as in the event that the VoLTE call is at risk of being downgraded or dropped. In some embodiments, the multi-radio UE 110 may continue to monitor the quality of the VoLTE call and may reactivate/enable the second radio in response to determining that the low quality of the VoLTE call indicates an imminent risk of losing the call (see, e.g., FIG. 14).

The multi-radio UE 110 may measure signal strength of serving eNB 404 of the multi-radio UE 110 and at least one base station of the second radio module (e.g., a GSM base station) and may send a measurement report 414 to the serving eNB 404. The serving eNB 404 of the multi-radio UE 110 may send a handover (HO) required (SRVCC) message via a signal 416 to the MME 406. The MME 406 may send a Packet-Switched-to-CS (PS-to-CS) HO request 418 to a mobile switching center (MSC 408).

In response to receiving a PS-to-CS handover response 420 from the MSC 408, the MME 406 may send a HO command 422 to the serving eNB 404 of the multi-radio UE 110. The serving eNB 404 of the multi-radio UE 110 may then send an E-UTRAN mobility command/notification 424 to the multi-radio UE 110. The MME 406 and the MSC 408 may update information regarding the IMS session for the multi-radio UE 110 in operation 426.

The multi-radio UE 110 may activate its second radio module (e.g., a GERAN module) and may contact a base station of the second radio module (e.g., a GSM base station) to begin a CS call, in operation 428. Once the CS call is established, the MSC 408 may send a PS-to-CS HO complete message 430 to the MME 406. In response, the MME 406 may release the S1 bearer via a signal 432.

In some embodiments, the multi-radio UE 110 may initiate a tracking area update (TAU) procedure to resume LTE services in operation 434. If dual transfer mode (DTM) is not supported by either the target GSM cell or the multi-radio UE 110, the PS domain would be suspended by the MME 406 during the SRVCC procedure. The TAU resumes the PS domain. If DTM is supported by both the target GSM cell and the multi-radio UE 110, the PS domain may be transferred to GSM in parallel with the SRVCC procedure. In this case, the multi-radio UE 110 may initiate a TAU procedure to transfer the PS domain back to LTE. If DTM is supported by the target GSM cell and the multi-radio UE 110, and PS domain is not transferred to GSM during the SRVCC procedure, then the multi-radio UE 110 may not initiate a TAU procedure. Instead, the multi-radio UE 110 may perform a Service Request procedure to enter RRC CONNECTED state to continue the PS services.

According to some embodiments, the SRVCC may be rejected by the serving base station controller (BSC) of the multi-radio UE 110 if the second radio module of the multi-radio UE 110 is active while the VoLTE call is ongoing.

In some embodiments, the multi-radio UE 110 may leverage its multiple radios to achieve better performance in certain situations in which conventional SRVCC implementations fail. In particular, after setting up the VoLTE call in operation 412, the multi-radio UE 110 may monitor the quality of the VoLTE call. In response to determining that the quality of the VoLTE call does not satisfy a minimum quality threshold and in response to determining that a conventional SRVCC handover command has not been received (i.e., the network 402 has not instructed the multi-radio UE 110 to move the call to a CS network), the multi-radio UE 110 may initiate a switch of the VoLTE call to a CS voice call independently (i.e., not in response to a signal from the network 402) by performing DRVCC (see, e.g., FIG. 15).

In an example, a multi-radio UE may have an ongoing IMS voice session in an evolved Universal Terrestrial Radio Access Network (E-UTRAN). In order to implement SRVCC, an eNB typically requests for signal measurements from both E-UTRAN and CS networks from the UE and, based on the analysis, orders the UE to transfer the IMS voice session to a CS voice session. However, in the event the eNB fails to order the UE to transfer the call to a CS network, the UE may make this transfer decision independently in response to determining that the multi-radio UE has lost E-UTRAN coverage (e.g., the quality of the VoLTE call has dropped below the minimum quality threshold).

In some embodiments, the network may control a call transfer in DRVCC by performing operations similar to those operations performed to implement SRVCC. This "network-controlled" DRVCC may be designed to have a minimal impact on the UE and network. In particular, because the UE may be unaware of the network's timing and/or resource allocations, the UE may unnecessarily waste network resources by initiating DRVCC too early or may increase the likelihood that a VoLTE call will be dropped and/or interrupted in the event the UE initiates DRVCC too late. In contrast, the UE's network may have access to information not available to the UE, such as information regarding network usage, capacity, available service, etc., thereby reducing the potential performance impact on the UE and/or the network during the DRVCC process. As a result of the network's superior access to information relevant to implementing DRVCC, the UE's network may have a better ability to coordinate and implement DRVCC in comparison to the UE.

Figure 5:
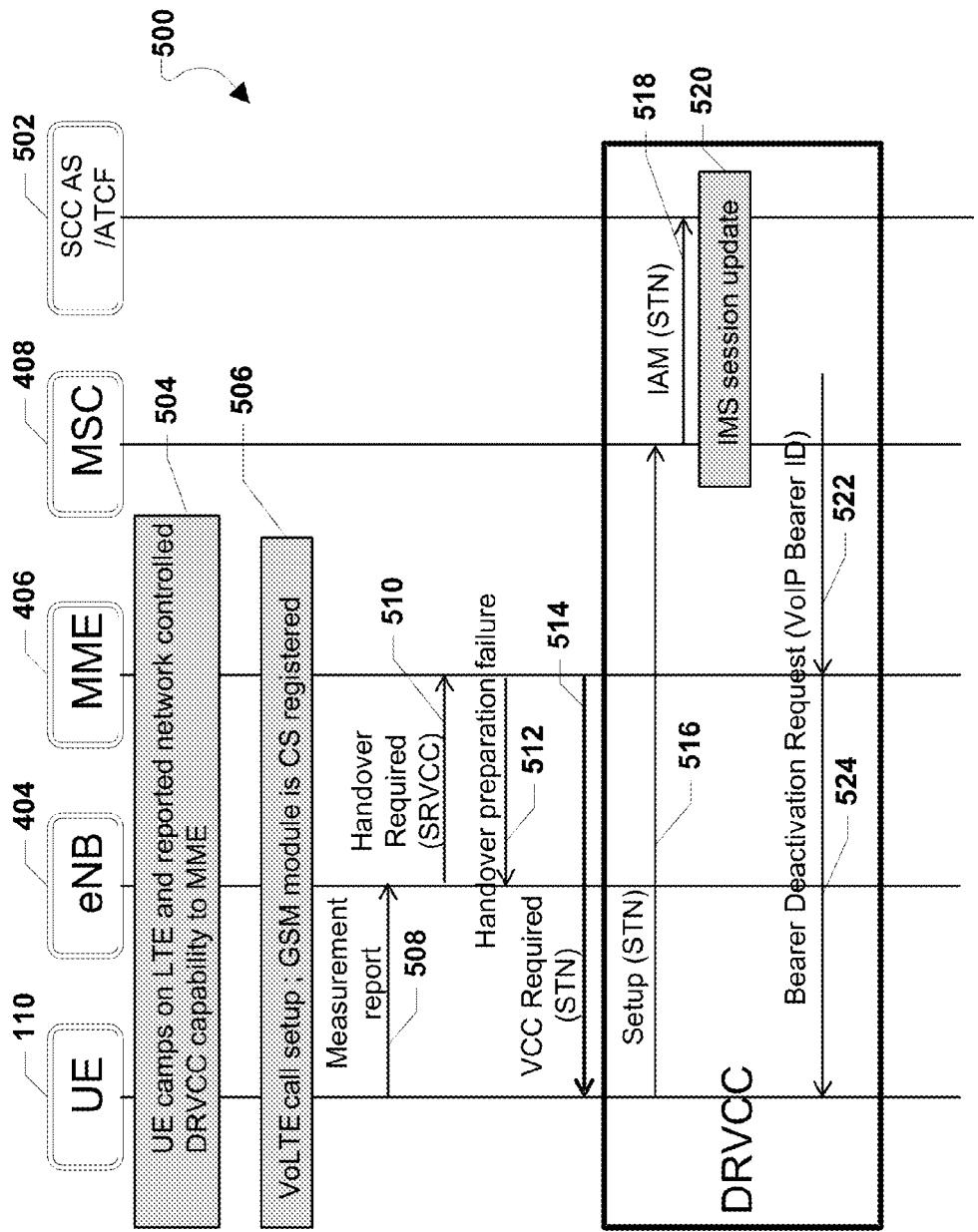
FIG. 5 is a signaling and call flow diagram illustrating communications exchanged between a UE and components in a network for implementing network-controlled dual radio voice call continuity (DRVCC) according to various embodiments.

FIG. 5 is a signaling and call flow diagram 500 illustrating communications exchanged between a multi-radio UE (e.g., the multi-radio UE 110 of FIGS. 1-2 and 4) and various components on a network for implementing network-controlled DRVCC, according to some embodiments.

With reference to FIGS. 1-5, the multi-radio UE 110 may camp on an LTE network (e.g., by camping on the serving eNB 404), and may report network-controlled DRVCC capability to an MME (e.g., the MME 406), in operation 504. The multi-radio UE 110 may setup a VoLTE call and register the second radio module (e.g., a GSM module) of the multi-radio UE 110 with a GSM network, in operation 506. The multi-radio UE 110 may perform measurements and may report them to the serving eNB 404 via a signal 508.

The serving eNB 404 may make a handover decision based at least in part on the received measurement reports. The serving eNB 404 may transmit a handover required (SRVCC) message 510 to the MME 406, for example when the serving eNB 404 determines that the multi-radio UE 110 should handover the VoLTE call to a CS network. The MME 406 may transmit a handover preparation failure message 512 to the serving eNB 404 in response to the handover required (SRVCC) message 510. The MME 406 may also transmit a VCC required message 514 to the multi-radio UE 110, and the VCC required message 514 may include a session transfer number (STN).

In some embodiments, the MME 406 may inform the multi-radio UE 110 to implement DRVCC by a new NAS message and may reject the SRVCC HO request 510 by sending a handover preparation failure message 512 to the serving eNB 404. According to such embodiments, the MME may inform the multi-radio UE 110 to perform DRVCC by a new NAS message or by reusing a Generic NAS Transportation message to carry the VCC Required (STN) information to the multi-radio UE 110.

In some embodiments, the multi-radio UE 110 may use the STN to initiate DRVCC. For example, the multi-radio UE 110 may send a CS call setup message 516 that includes the STN to an MSC 408. The MSC 408 may send an initial address (IAM) message 518, along with the STN, to a service centralization and continuity application server (SCC AS)/access transfer control function (ATCF) 502. The MSC 408 and the SCC AS/ATCF 502 may update the IMS session for the multi-radio UE 110 in operation 520. The SCC AS/ATCF 502 may also send a bearer deactivation request for the VoIP bearer via a signal 522 to the MME 406. The MME 406 may deactivate the VoIP bearer and send a bearer deactivation request for the VoIP bearer to the multi-radio UE 110 via a signal 524.

According to some embodiments, the MME 406 may check the multi-radio UE 110's device identity (e.g., the International Mobile Equipment Identity Software Version or IMEISV) to determine whether the multi-radio UE 110 has network-controlled DRVCC capabilities. In some embodiments, in the event that the MME 406 determines that the multi-radio UE 110 has network-controlled DRVCC capabilities (e.g., by checking the multi-radio UE 110's device identity), the multi-radio UE 110 may not need to report its network-controlled DRVCC capabilities, thereby eliminating the need to change standard network access stratum (NAS) protocols.

Some differences exist between network-controlled DRVCC and SRVCC. For example, in SRVCC, a UE may be controlled to take measurements in the CS domain during measurement gaps. In network-controlled DRVCC, there may not be a need for measurement gaps, for example, due to the dual radio. In SRVCC, the network may decide if the UE should handover to CS.

In SRVCC, the UE transmits the measurement report message to the eNB, which makes the determination that SRVCC should be performed. In network-controlled DRVCC, the UE transmits the CS origination message to the MSC via a GSM or CDMA2000 base station.

Figure 6:
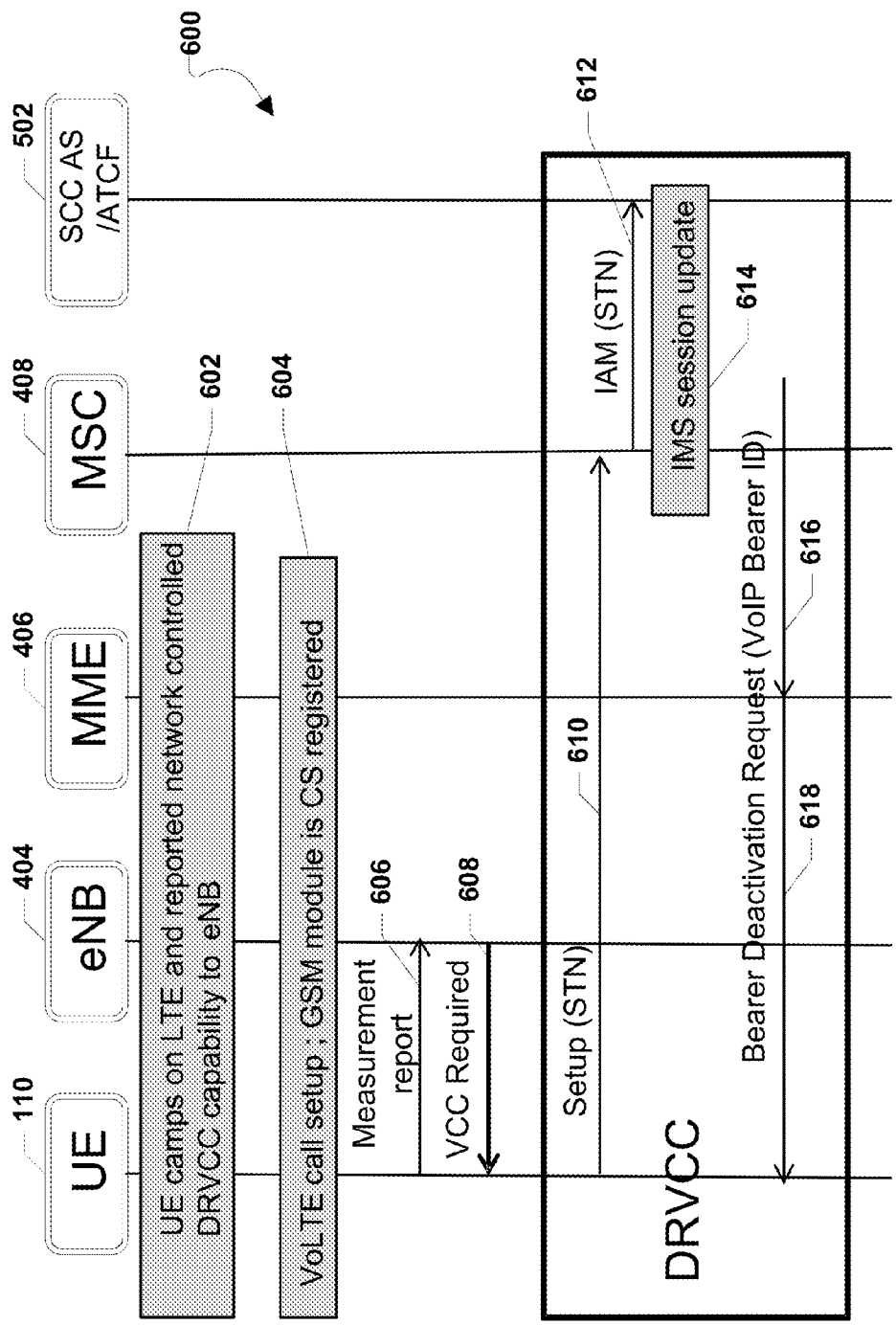
FIG. 6 is a signaling and call flow diagram illustrating communications exchanged between a UE and components in a network for implementing network-controlled DRVCC according to various embodiments.

FIG. 6 is a signaling and call flow diagram 600 illustrating communications exchanged between a multi-radio UE (e.g., the multi-radio UE 110 of FIGS. 1-2 and 4-5) and various components on a network (e.g., the serving eNB 404 of FIGS. 4-5, the MME 406, the MSC 408, and the SCC AS/ATCF 502 of FIG. 5) for implementing network-controlled DRVCC, according to some embodiments. With reference to FIGS. 1-6, in such embodiments, the LTE PS connection for the multi-radio UE 110 may not be impacted by the network-controlled DRVCC procedure.

The multi-radio UE 110 may camp on an LTE network and may report network-controlled DRVCC capabilities to the UE's serving, in operation 602. The multi-radio UE 110 may setup a VoLTE call and may register a second radio module of the multi-radio UE 110 (e.g., a GSM module) with a GSM network, in operation 604. The multi-radio UE 110 may perform measurements and may report those measurements to the serving eNB 404 via a signal 606. The serving eNB 404 may make a handover decision based at least in part on the received measurement reports.

In some embodiments, the serving eNB 404 may transmit a VCC required message 608 to the multi-radio UE 110 rather than sending a handover command (as the serving eNB 404 may when SRVCC is being performed, see, e.g., FIG. 4) or an RRC Connection Release message. The multi-radio UE 110 may be pre-configured with a STN by, for example, an Open Mobile Alliance Device Management (OMA-DM) server. The multi-radio UE 110 may send a CS call setup message 610, along with the STN, to the MSC 408.

The MSC 408 may send an initial address message (IAM) 612 including the STN to the SCC AS/ATCF 502. The MSC 408 and the SCC AS/ATCF 502 may update the IMS session for the UE in operation 614. The SCC AS/ATCF 502 may also send a bearer deactivation request for the VoIP bearer to the MME 406 via a signal 616. The MME 406 may deactivate the VoIP bearer and send a bearer deactivation request 618 for the VoIP bearer to the multi-radio UE 110.

According to some embodiments, when an eNB determines SRVCC is needed, the serving eNB 404 informs a UE to perform SRVCC by a new radio resource configuration (RRC) message.

According to some embodiments, an eNB may not need to configure a measurement gap for a multi-radio UE to measure GSM signals because the multi-radio UE supports multiple simultaneous radio operations and, thus may be able to measure GSM signals with a second radio without tuning the first radio away from LTE signals. In such embodiments, the multi-radio UE may be able to take measurements of GSM signals very quickly because the second radio (e.g., a GSM radio module) may be able to monitor the GSM signal without interruption.

In some embodiments, by implementing network-controlled DRVCC rather than SRVCC, there may be no need for an S102 interface between the MME 406 and the MSC 408 (e.g., an interface between MME 406 and a CDMA1x network).

Figure 7:
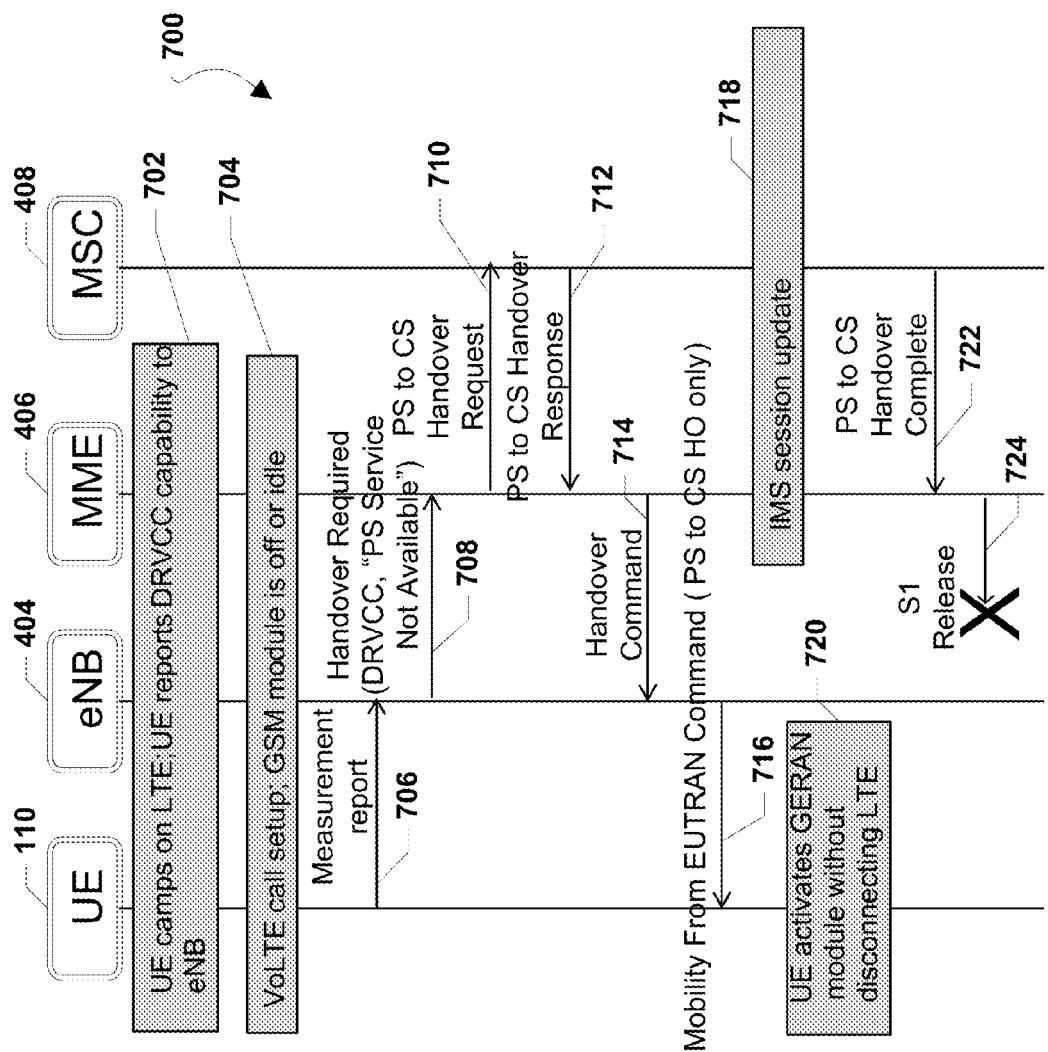
FIG. 7 is a signaling and call flow diagram illustrating communications exchanged between a UE and components in a network for implementing network-controlled DRVCC according to various embodiments.

FIG. 7 is a signaling and call flow diagram 700 illustrating communications exchanged between a multi-radio UE (e.g., the multi-radio UE 110 of FIGS. 1-2 and 4-6) and various components on a network (e.g., the serving eNB 404 of FIGS. 4-6, the MME 406, and the MSC 408) for implementing network-controlled DRVCC, according to some embodiments.

With reference to FIGS. 1-7, the multi-radio UE 110 may camp on an LTE network and may report its network-controlled DRVCC capability to the serving eNB 404 of the multi-radio UE 110, in operation 702. The multi-radio UE 110 may setup a VoLTE call in operation 704. In some embodiments of operation 704, the multi-radio UE 110 may deactivate a second radio (e.g., a GSM module) of the multi-radio UE 110 before, at the time of, or after the VoLTE call is set up (see FIG. 14). The multi-radio UE 110 may perform measurements and may report the measurements to the serving eNB 404 via a signal 706.

The serving eNB 404 may make a handover decision based at least in part on the received measurement reports. The serving eNB 404 may transmit a handover required message 708 to the MME 406, and the message 708 may include an indication that the multi-radio UE 110 includes network-controlled DRVCC capability, for example when the serving eNB 404 determines that the multi-radio UE 110 should handover to a CS network. The MME 406 may send a PS-to-CS HO request 710 to the MSC 408. In response to receiving a PS-to-CS handover response 712 from the MSC 408, the MME 406 may send a HO command 714 to the serving eNB 404.

The serving eNB 404 may send an E-UTRAN mobility notification 716 to the multi-radio UE 110, in which the E-UTRAN mobility notification 716 indicates that the multi-radio UE 110 should handover only the VoLTE call from PS to CS (i.e., from the LTE network to a CS network). The MME 406 and the MSC 408 may update information regarding the Internet Protocol Multimedia Subsystem (IMS) session for the multi-radio UE 110 in operation 718.

The multi-radio UE 110 may activate its GERAN module and may contact a GSM base station to begin a CS call without disconnecting from the LTE network, in operation 720. When the CS call is established, the MSC 408 may send a PS-to-CS HO complete message 722 to the MME 406. However, the MME 406 may not release the S1 bearer, and the serving eNB 404 and the multi-radio UE 110 may not release the RRC connection (not shown).

According to some embodiments, a serving base station controller (BSC) of a UE may reject SRVCC operations in the event that the UE's second radio module (e.g., the GSM module) is active while the VoLTE call is ongoing.

According to some embodiments, an eNB may indicate DRVCC to an MME in a S1 handover required message so that the MME may not release the S1 connection after the handover.

According to some embodiments, an eNB may include a new parameter in an E-UTRAN Mobility Command to indicate to a UE not to release LTE.

Figure 8:
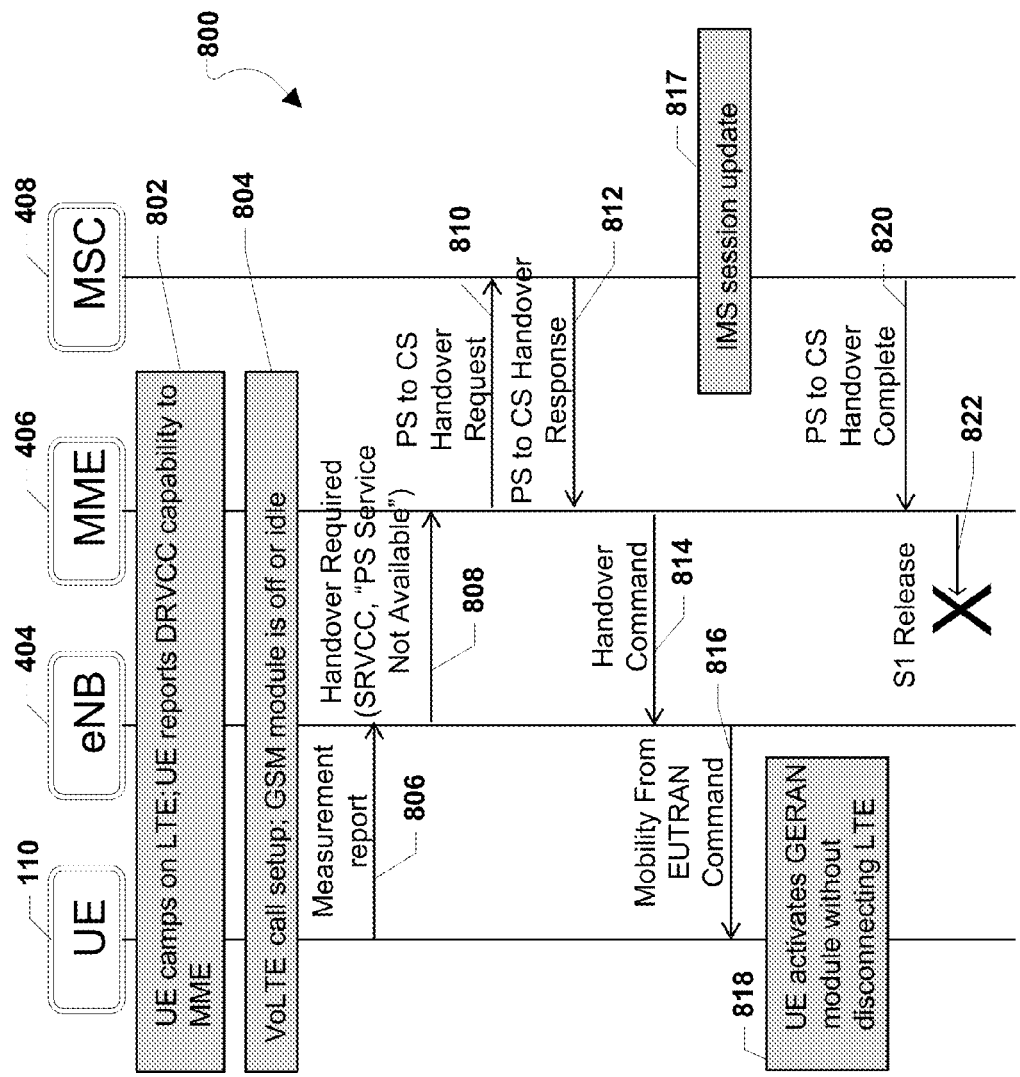
FIG. 8 is a signaling and call flow diagram illustrating communications exchanged between a UE and components in a network for implementing network-controlled DRVCC according to various embodiments.

FIG. 8 is a signaling and call flow diagram 800 illustrating communications exchanged between a multi-radio UE (e.g., the multi-radio UE 110 of FIGS. 1-2 and 4-7) and various components on a network (e.g., the serving eNB 404 of FIGS. 4-7, the MME 406, and the MSC 408) for implementing network-controlled DRVCC, according to some embodiments. In such embodiments, the network may not support DRVCC operations but may be aware of a UE's DRVCC capabilities and, thus, may be able to assist the UE in performing UE-controlled DRVCC.

With reference to FIGS. 1-8, the multi-radio UE 110 may camp on an LTE network (e.g., via a first radio that support a subscription to the LTE network) and may report to the MME 406 that the multi-radio UE 110 supports network-controlled DRVCC, in operation 802. In operation 804, the multi-radio UE 110 may setup a VoLTE call while a second radio of the multi-radio UE 110 (e.g., a GSM module) is deactivated or idle.

The multi-radio UE 110 may perform measurements and may report these measurements to the serving eNB 404 of the multi-radio UE 110 via a signal 806. The serving eNB 404 may make a handover decision based at least in part on the received measurement reports. The serving eNB 404 may transmit a handover required message 808 to an MME 406, and the handover required message 808 may indicate the need for SRVCC and/or that PS service is not available for the multi-radio UE 110. The MME 406 may send a PS-to-CS HO request 810 to the MSC 408. In response to receiving a PS-to-CS handover response 812 from the MSC 408, the MME 406 may send a HO command 814 to the serving eNB 404.

The serving eNB 404 may then send an E-UTRAN mobility notification/command 816 to the multi-radio UE 110. The MME 406 and the MSC 408 may update information regarding the IP multimedia subsystem (IMS) session for the multi-radio UE 110, in operation 817.

In operation 818, the multi-radio UE 110 may activate a GERAN module and may contact a GSM base station to begin a CS call without disconnecting from the LTE network. When the CS call is established, the MSC 408 may send a HO complete message 820 to the MME 406. However, the MME 406 may not release an S1 bearer, and the serving eNB 404 and the multi-radio UE 110 may not release an RRC connection.

According to some embodiments, a UE may report its DRVCC capability to an MME so that the MME may not release the S1 connection 822 after the handover.

According to some embodiments, a UE's serving base station controller (BSC) may reject SRVCC operations in the event that the UE's GSM module is active while the VoLTE call is ongoing.

Figure 9:
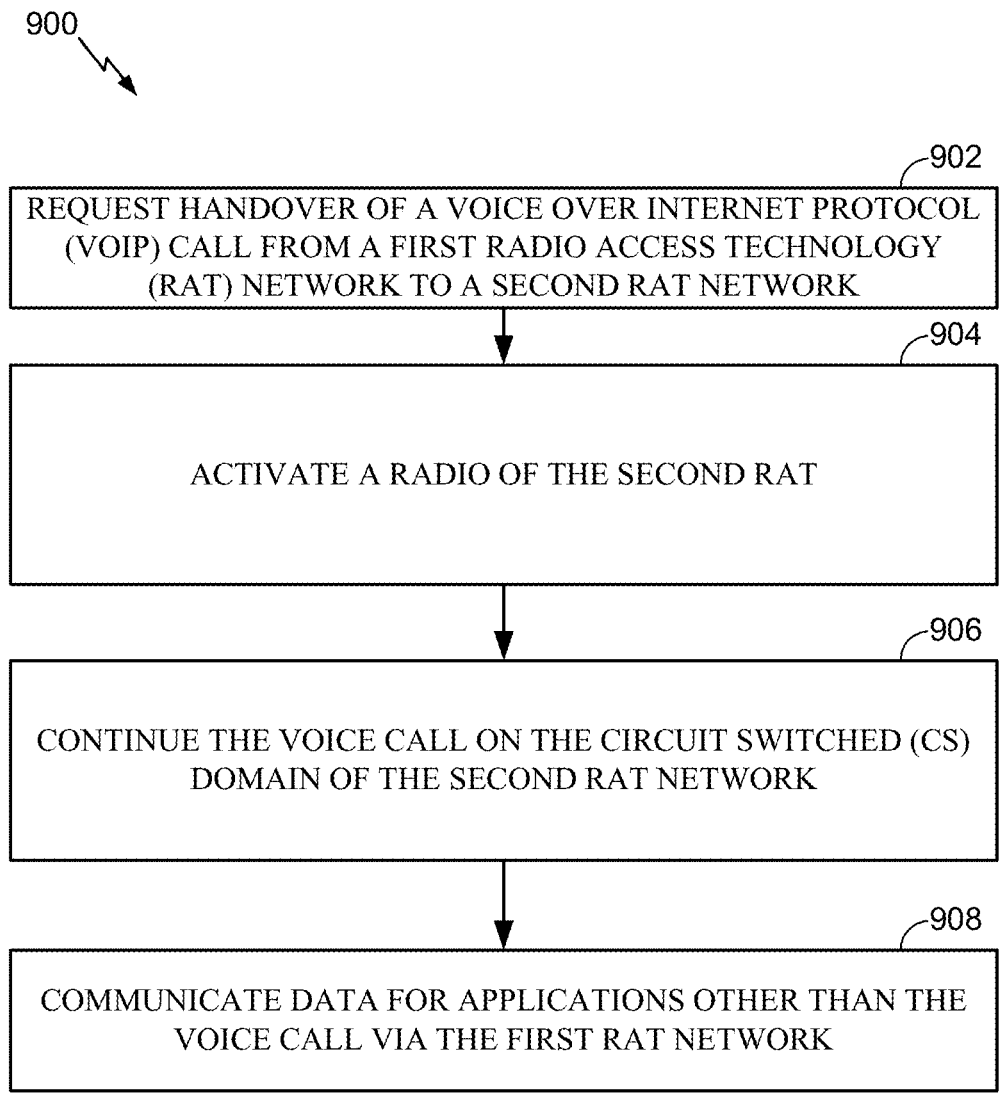
FIG. 9 is a process flow diagram illustrating a method for implementing SRVCC according to various embodiments.

FIG. 9 illustrates a method 900 for implementing SRVCC, according to some embodiments. The method 900 may be implemented with a processor (e.g., the modem processor 210 of FIG. 2, the controller/processor 230, the controller/processor 390 of FIG. 3, a separate controller, and/or the like) of a multi-radio UE (e.g., the multi-radio UEs 110, 350 described with reference to FIGS. 1-8).

With reference to FIGS. 1-9, the UE processor may begin performing the operations of the method 900 by requesting handover of a voice over Internet protocol (VoIP) call (e.g., a VoLTE call) from a first radio access technology (RAT) network (e.g., an LTE network) to a second RAT network (e.g., a GSM network) in block 902. The request may be sent, for example, to the multi-radio UE's serving eNodeB (e.g., the serving eNB 404).

In block 904, the UE processor may activate a radio of the second RAT. In some embodiments, the second RAT may be associated with a CS network. In block 906, the UE processor may continue the voice call on the circuit switched (CS) domain of the second RAT network.

In block 908, the UE processor may communicate data for applications other than the voice call via the first RAT network. For example, the UE processor may continue to utilize the first RAT network for PS data services and may utilize the second RAT network to service the voice call.

In some embodiments, the UE processor may request the handover of the VoIP call in various circumstances. For example, the UE processor may determine that the first RAT network does not (or no longer) supports Circuit-Switch-Fall-Back (CSFB) or VoLTE (e.g., when the multi-radio UE moves to a new cell area) and, in response, may attempt to move the VoIP/VoLTE call to a CS network to avoid losing the call.

In another example, the first RAT network may implement SRVCC or DRVCC to move the VoIP call to a CS network in order to conduct the voice call on the UE's second radio while simultaneously receiving PS data services via the UE's first radio. In other words, while the first RAT network may support VoLTE calls and/or CSFB, the UE processor may initiate SRVCC and/or DRVCC operations in order to simultaneously receive both CS voice services and PS data services via the first and second radios.

Figure 10:
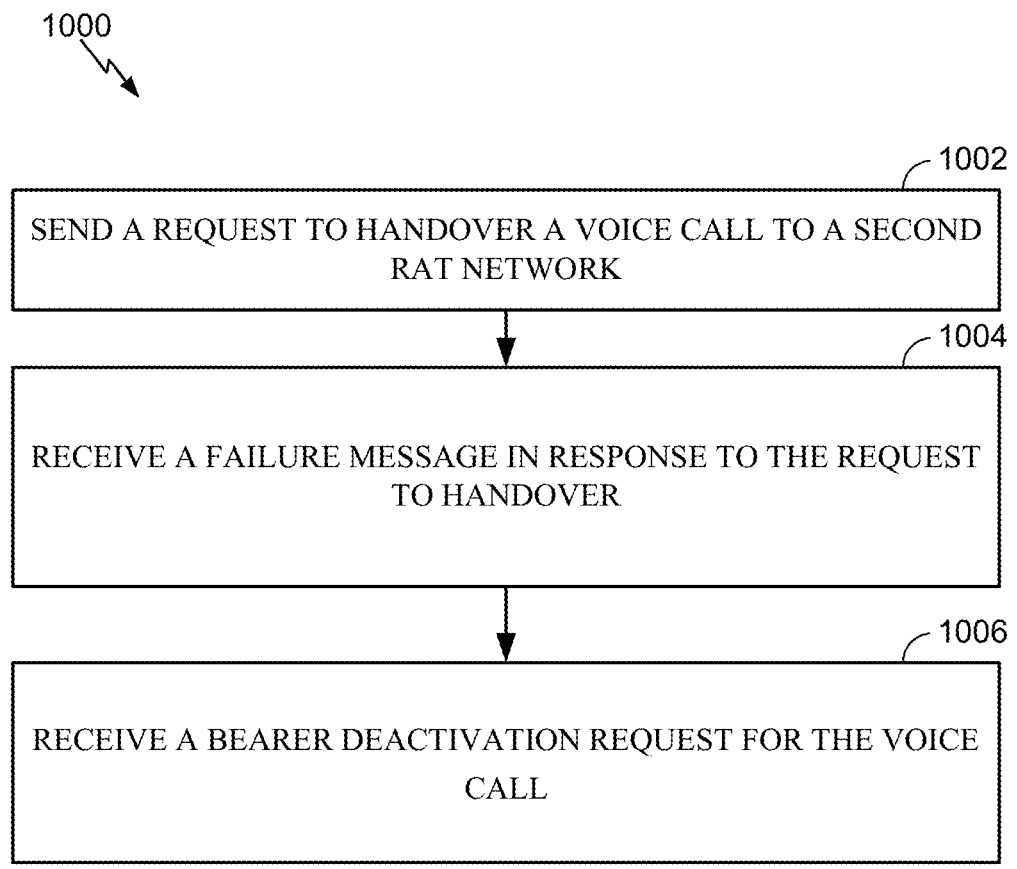
FIG. 10 is a process flow diagram illustrating a method for implementing DRVCC according to various embodiments.

FIG. 10 illustrates a method 1000 for implementing DRVCC, according to some embodiments. The method 1000 may be implemented with a processor (e.g., the controller/processor 240 of FIG. 2, the controller/processor 340 of FIG. 3, a separate controller, and/or the like) of a base station (BS) of a first RAT (e.g., the eNBs 122, 310, 404 described with reference to FIGS. 1-8).

With reference to FIGS. 1-10, the BS processor may begin performing the operations of the method 1000 in block 1002 by sending a request to handover a voice call to a second RAT network. For, example, the BS processor may send the request to a mobility management entity (MME) of the second RAT network.

In block 1004, the BS processor may receive a failure message in response to sending the request to handover to the second RAT network. The failure message may include a handover preparation failure message and may be received from an MME in the second RAT network, for example.

In block 1006, the BS processor may receive a bearer deactivation request for the voice call.

Figure 11:
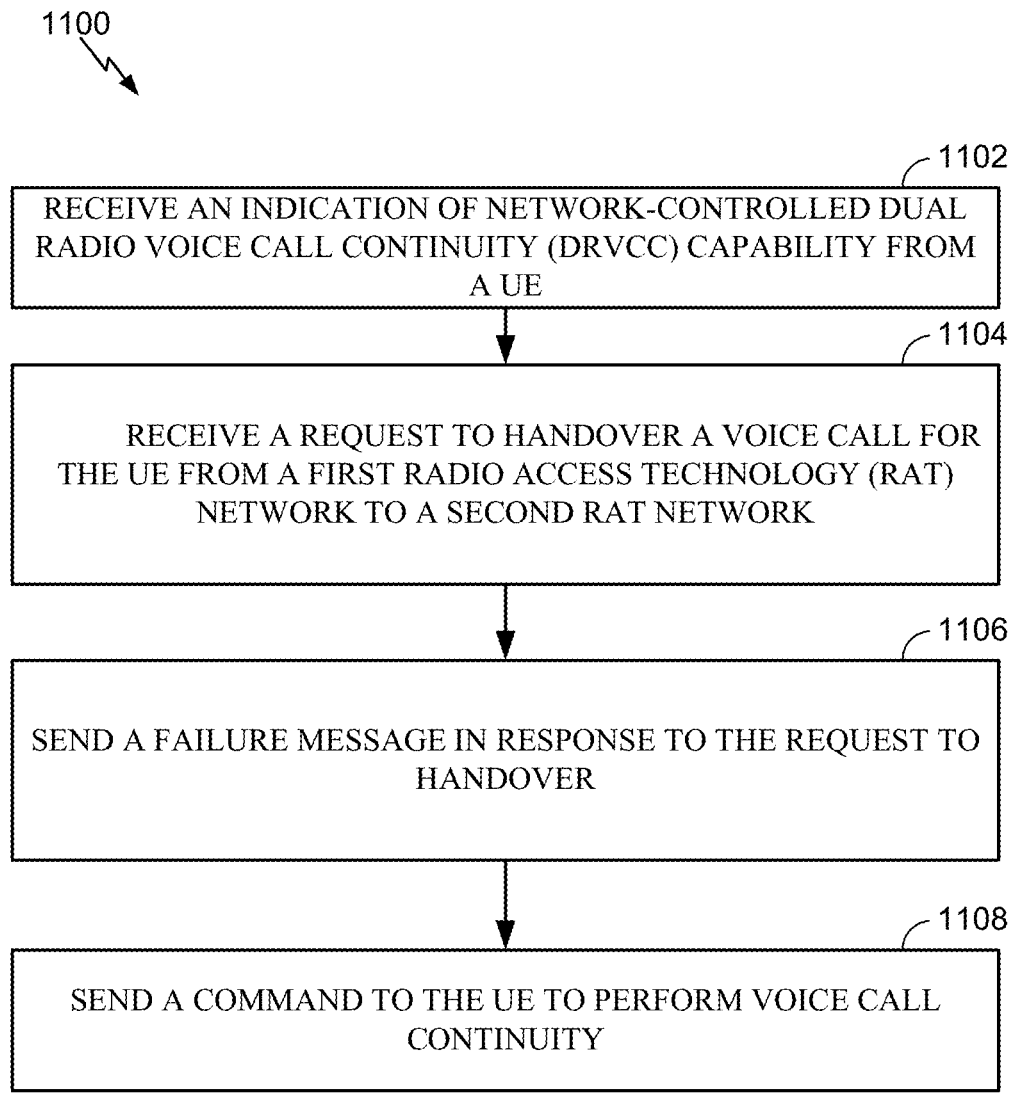
FIG. 11 is a process flow diagram illustrating another method for implementing DRVCC according to various embodiments.

FIG. 11 illustrates a method 1100 for implementing DRVCC, according to some embodiments. The method 1100 may be implemented with a processor (e.g., the controller/processor 250 of FIG. 2, a separate controller, and/or the like) of an MME (e.g., the MME 126, 406 described with reference to FIGS. 1, 2, and 4-8).

With reference to FIGS. 1-11, the MME processor may begin performing operations of the method 1100 in block 1102 by receiving an indication of network-controlled DRVCC capability from a UE. In block 1104 the MME may receive a request to handover a voice call for the UE from a first RAT network to a second RAT network. The handover request may be received from the UE's serving eNodeB, for example. In block 1106, the MME may send a failure message in response to the request to handover. The failure message may comprise a handover preparation failure message, for example. In block 1108 the MME may send a command to the UE to perform voice call continuity.

Figure 12:
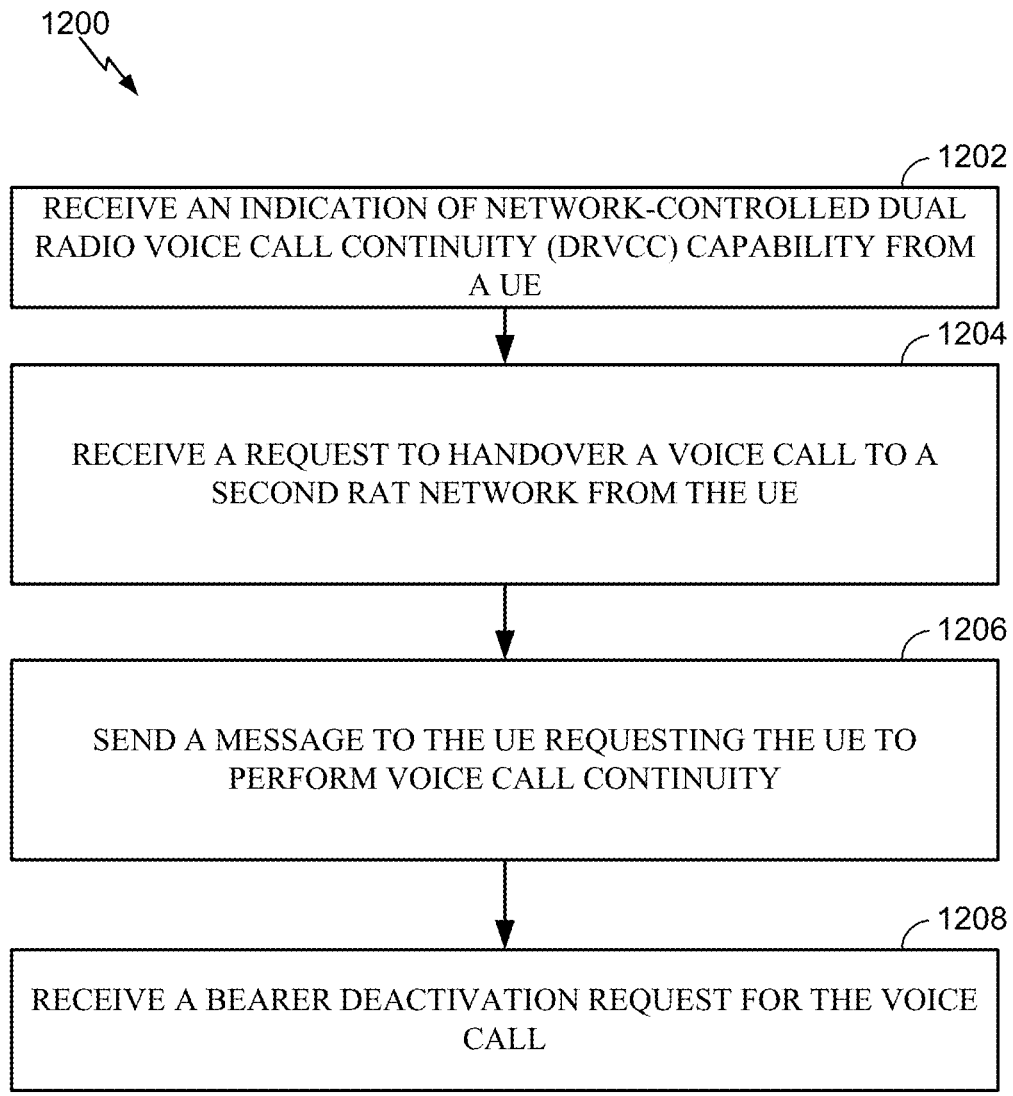
FIG. 12 is a process flow diagram illustrating another method for implementing DRVCC according to various embodiments.

FIG. 12 illustrates a method 1200 for implementing DRVCC, according to some embodiments. The method 1200 may be implemented with a processor (e.g., the controller/processor 240 of FIG. 2, the controller/processor 340 of FIG. 3, a separate controller, and/or the like) of a base station (BS) of a first RAT (e.g., the eNBs 122, 310, 404 described with reference to FIGS. 1-8).

With reference to FIGS. 1-12, the BS processor may begin performing the operations of the method 1200 in block 1202 by receiving an indication of network-controlled DRVCC capability from a UE. In block 1204, the BS processor may receive a request to handover a voice call to a second RAT network from the UE.

In block 1206, the BS processor may send a message to the UE requesting the UE to perform voice call continuity. In block 1208, the BS processor may receive a bearer deactivation request for the voice call.

Figure 13:
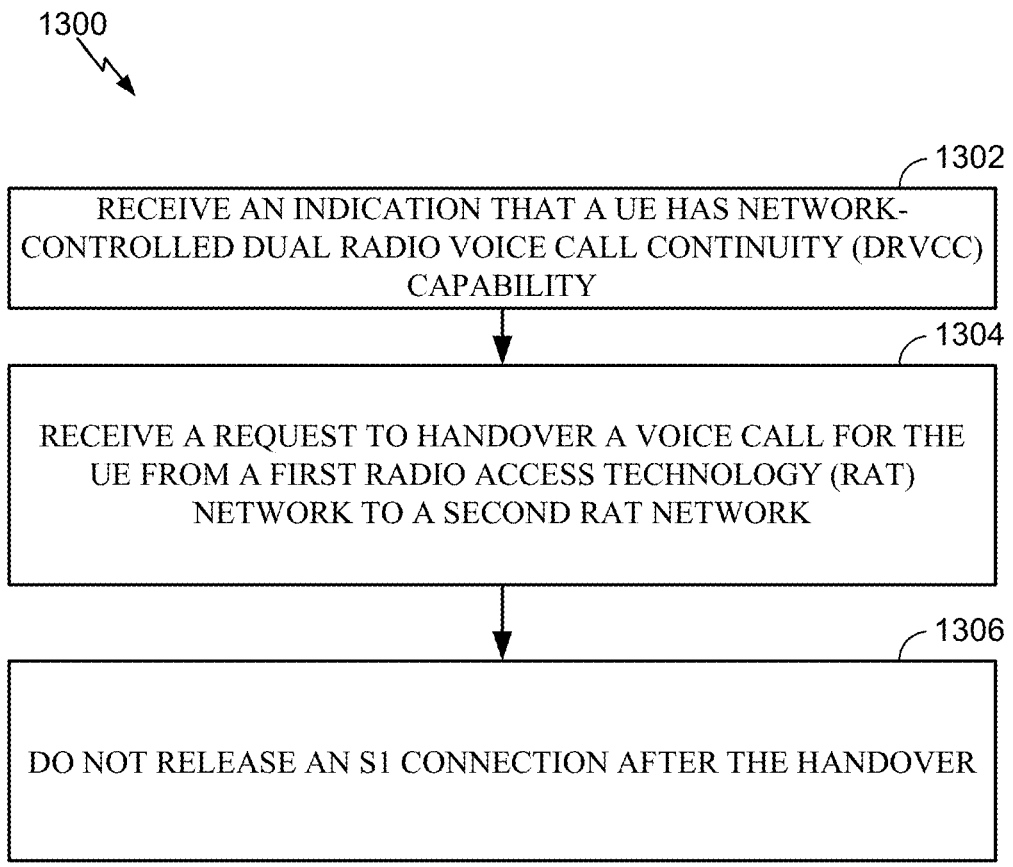
FIG. 13 is a process flow diagram illustrating another method for implementing DRVCC according to various embodiments.

FIG. 13 illustrates a method 1300 for implementing DRVCC, according to some embodiments. The method 1300 may be implemented with a processor (e.g., the controller/processor 250 of FIG. 2, a separate controller, and/or the like) of an MME (e.g., the MME 126, 406 described with reference to FIGS. 1, 2, and 4-8).

With reference to FIGS. 1-13, the MME processor may begin performing the operations of the method 1300 in block 1302 by receiving an indication that a UE has network-controlled DRVCC capability. In some embodiments, the MME processor may receive the indication from the UE or from the UE's serving eNodeB, for example.

In block 1304, the MME processor may receive a request to handover a voice call for the UE from a first RAT network to a second RAT network. The handover request may be received from the UE's serving eNodeB, for example. In block 1306 the MME may not release an S1 connection after the handover. The S1 connection may be for data services to the UE, for example.

Figure 14:
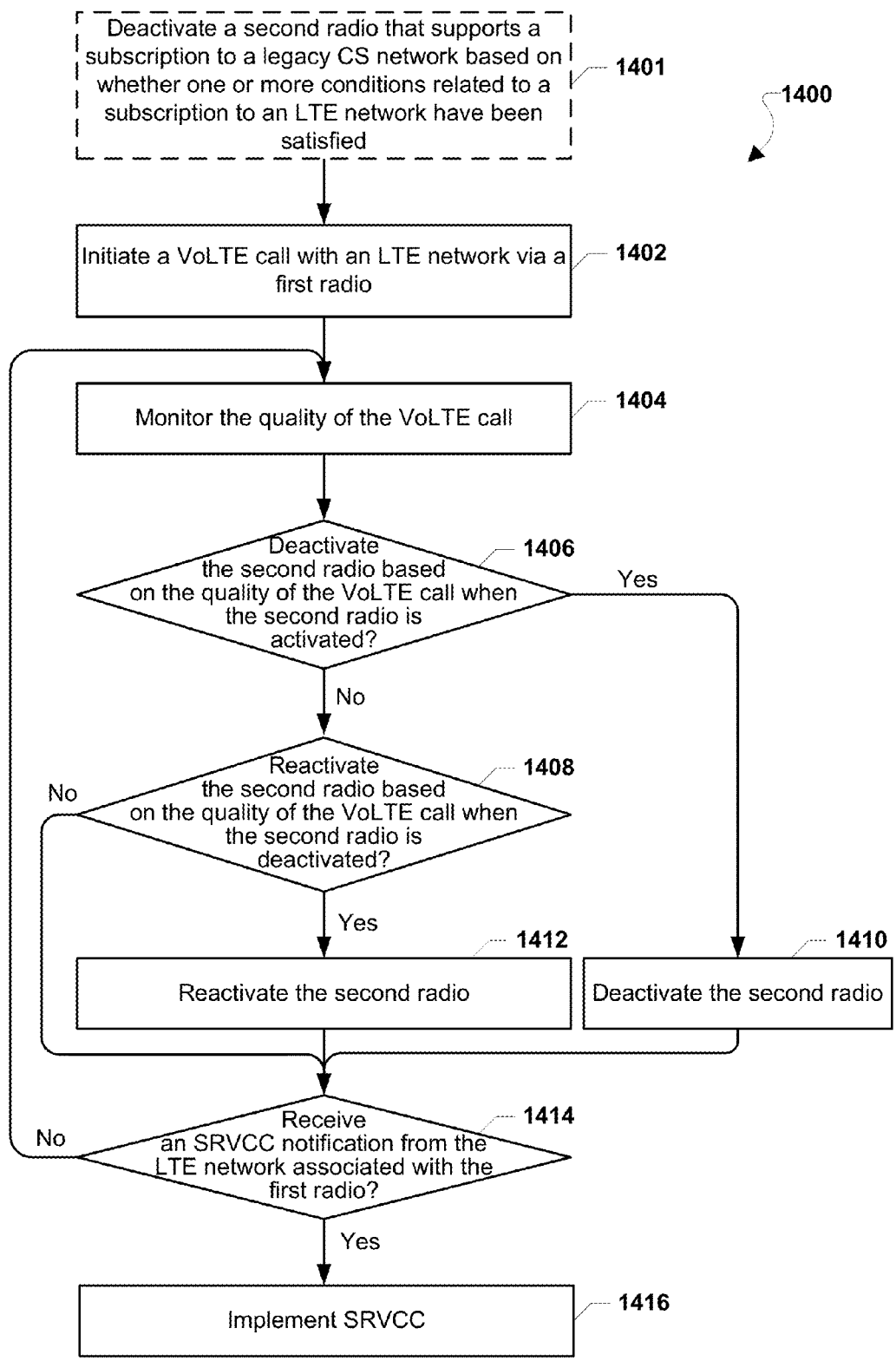
FIG. 14 is a processor flow diagram illustrating a method for selectively enabling and/or disabling a second radio based on a status of a VoLTE call on a first radio, according to various embodiments.

FIG. 14 illustrates a method 1400 for selectively deactivating and/or enabling a second radio of a multi-radio UE based on a quality or status of the VoLTE call according to some embodiments. The method 1400 may be implemented with a processor (e.g., the modem processor 210 of FIG. 2, the controller/processor 230, the controller/processor of FIG. 3, a separate controller, and/or the like) of a multi-radio UE (e.g., the multi-radio UEs 110, 350 described with reference to FIGS. 1-8).

With reference to FIGS. 1-14, in some embodiments, the UE processor may selectively deactivate/disable a second radio of the multi-radio UE based on the quality and/or status of a VoLTE call maintained on a first radio in order to save power. Specifically, in situations in which the quality of the VoLTE call satisfies (i.e., is equal to or greater than) a minimum quality threshold, the UE processor may determine that there is a low likelihood of needing to transfer the call to the second radio module (i.e., a low likelihood of performing SRVCC). In other words, the UE processor may disable or deactivate the second radio module until the quality of the VoLTE call does not satisfy or is about to fall below the minimum quality threshold, which may indicate that the second radio may need to participate in SRVCC operations in the near future to prevent dropping the call.

Further, in some optional embodiments, the UE processor may optionally deactivate a second radio that supports a subscription to a legacy CS network in optional block 1401 based on whether one or more conditions related to a subscription to an LTE network have been satisfied.

In some embodiments, the UE processor may deactivate the second radio in optional block 1401 in response to determining that the LTE subscription is communicating with an LTE network that supports VoLTE calls. In such embodiments, the LTE subscription may use the first radio to initiate VoLTE calls, and thus the UE processor may deactivate the second radio in order to save power because the second radio is unlikely to be needed to initiate voice calls while the first radio is able to conduct VoLTE calls with acceptable call quality.

In some embodiments, the UE processor may deactivate the second radio in optional block 1401 in response to determining that the LTE subscription has utilized the first radio to successfully perform a Session Initiation Protocol (SIP) registration to an IMS in the LTE network. SIP is a signaling communications protocol used for controlling voice calls over IP networks (e.g., the LTE network), among other things. Thus, a successful SIP registration to the IMS may indicate that the LTE subscription may be able to conduct VoIP/VoLTE calls via the first radio and that the second radio may be deactivated to save power as the second radio is not needed to initiate voice calls.

In some embodiments, the UE processor may deactivate the second radio in optional block 1401 in response to determining that the current area of the multi-radio UE is included in a tracking area list that includes areas known to support VoLTE. In other words, as described, the UE processor may deactivate the second radio while the LTE subscription is able to communicate with an LTE network that supports VoLTE. In some embodiments, the LTE subscription may perform a Non-Access-Stratum (NAS) attachment to the LTE network, and as a result, the UE processor may receive a message from the LTE network that indicates whether the multi-radio UE's current area supports VoLTE (e.g., via a "Voice Over IMS PS session Supported Indication" parameter included in an Attach Accept). In additional (or alternative) embodiments, the UE processor may perform a TAU with the LTE network and, in response, may receive a TAU accept message from the LTE network that includes information regarding whether the current area of the multi-radio UE supports VoLTE (see 3GPP Technical Standard 24.301).

In some embodiments of the operations performed in optional block 1401, the UE processor may deactivate the second radio based on the Short Message Service (SMS) registration status of the LTE subscription. Particularly, the UE processor may deactivate the second radio in response to determining that the LTE network supports SMS over IMS and/or SMS over SGs. SGs is the interface between MSC and MME for circuit-switched-fall-back operations or SMS over SGs. Thus, in some embodiments, for the device processor to be able to disable the second radio (e.g., the radio supporting GSM/cdma1x communications) without risking performance degradation, the LTE network may need to support SMS sending/receiving via one or more SMS on LTE, such as SMS over IMS, SMS over SGs/S102.

In some embodiments, the UE processor may deactivate the second radio in optional block 1401 in response to determining that the LTE subscription is in communication with an LTE network that support CS fall back (CSFB) operations, even though the LTE network does not support VoLTE. The UE processor may make such a determination by determining whether the current area of the multi-radio UE is included in a tracking area list that includes areas that support CSFB operations.

In block 1402, the UE processor may initiate a VoLTE call with the LTE network via the first radio. In some embodiments in which the UE processor deactivates the second radio in optional block 1401, the UE processor may reactivate the second radio in response to initiating the VoLTE call in block 1402.

In some embodiments of the operations performed in blocks 1401-1402, the UE processor may determine whether the LTE network supports VoLTE and, in response to determining that the network does support VoLTE, the multi-radio UE may attempt IP Multimedia Subsystem (IMS) registration with the LTE network. In response to a successful IMS registration, the UE processor may deactivate the second radio (e.g., a radio associated with a subscription to a GSM network). The UE processor may also update an IMS-supported flag included in a Tracking Area Update (TAU) response to the LTE network that indicates that the second radio module has been deactivated or set to idle.

In block 1404, the UE processor may monitor the quality of the VoLTE call initiated in block 1402, such as by taking power/signal measurements and/or receiving quality-of-service information for the VoLTE call directly from the LTE network. In some embodiments of the operations performed in block 1404, the UE processor may monitor the quality of the VoLTE call by measuring the number of voice packets that the multi-radio UE receives from the LTE network over a certain period of time. In such embodiments, a lower number of packets received over a certain period of time may indicate a lower quality because of a weak or degraded communication link with the LTE network.

In determination block 1406, the UE processor may determine whether to deactivate the second radio based on the quality of the VoLTE call in the event that the second radio is already active, such as by determining whether the quality of the VoLTE call satisfies (e.g., is equal to or greater than) the minimum quality threshold. In response to determining that the second radio should be deactivated based on the quality of the VoLTE call (i.e., determination block 1406="Yes"), the UE processor may deactivate the second radio in block 1410. For example, the UE processor may set the second radio to an idle or standby mode, power down one or more components of the second radio, etc.

In response to determining that the second radio should not be deactivated based on the quality of the VoLTE call (i.e., determination block 1406="No"), the UE processor may determine whether to reactivate the second radio based on the quality of the VoLTE call in the event that the second radio is currently deactivated in determination block 1408.

In some embodiments of the operations performed in determination block 1408, the UE processor may activate/enable the second radio module in response to determining that the quality of the VoLTE call does not satisfy (e.g., is less than) a minimum quality threshold. Specifically, while the VoLTE call is ongoing, the UE processor may selectively turn on the second radio module in response to determining that the quality of the VoLTE call is degraded, which may indicate that the UE processor may need to perform SRVCC or DRVCC in the near future to maintain the call. In such embodiments, the UE processor may receive one or more support messages from the LTE network that indicate that the quality of the VoLTE is or is about to be degraded and/or may determine that the VoLTE call is associated with an error rate that is greater than a minimum error-rate threshold. In response to determining that the second radio should be reactivated based on the quality of the VoLTE call (i.e., determination block 1408="Yes"), the UE processor may reactivate the second radio in block 1412, such as by configuring the second radio to resume normal, active operations.

In response to determining that the second radio should not be reactivated (i.e., determination block 1408="No"), after reactivating the second radio in block 1412, or deactivating the second radio in block 1410, the UE processor may determine whether an SRVCC notification has been received from the LTE network associated with the first radio in determination block 1414. In other words, the UE processor may determine whether the LTE network has sent a notification that the VoLTE call is about to be dropped and that the call should be moved to a CS network to continue the call, as described.

In response to determining that an SRVCC notification has not been received from the LTE network (i.e., determination block 1414="No"), the UE processor may repeat the above operations by again monitoring the quality of the VoLTE call in block 1404 and selectively activating or deactivating the second radio based on the quality and/or status of the VoLTE call.

In response to determining that an SRVCC notification has been received from the LTE network (i.e., determination block 1414="Yes"), the UE processor may implement SRVCC in block 1416 as described (see, e.g., FIG. 4). In other words, the UE processor may switch the call from the first radio to the second radio in order to continue the call via a legacy CS network.

In some embodiments of the operations performed in block 1416, the UE processor may continue receiving data services (e.g., PS data services) from the LTE network via the first radio, such as by performing a Tracking Area Update to resume receiving PS data services from the LTE network after moving the voice call to the CS network (see, e.g., FIG. 4). In such embodiments, the UE processor may utilize a timer to ensure that PS data services of the LTE network are not restarted too soon for the LTE network to handle. For example, the timer may be based on an amount of time needed for the LTE network to perform one or more standard LTE protocol tear downs and/or start ups.

In some embodiments, because the UE processor dynamically assesses the likelihood that the VoLTE call will fail or be dropped by monitoring the quality of the VoLTE call, the second radio may have a higher likelihood of being active in situations in which SRVCC may be necessary to preserve a voice call. This may maintain the benefit of having the second radio available for implementing SRVCC while reducing the overall amount of power needed to keep the first and second radios active.

Figure 15:
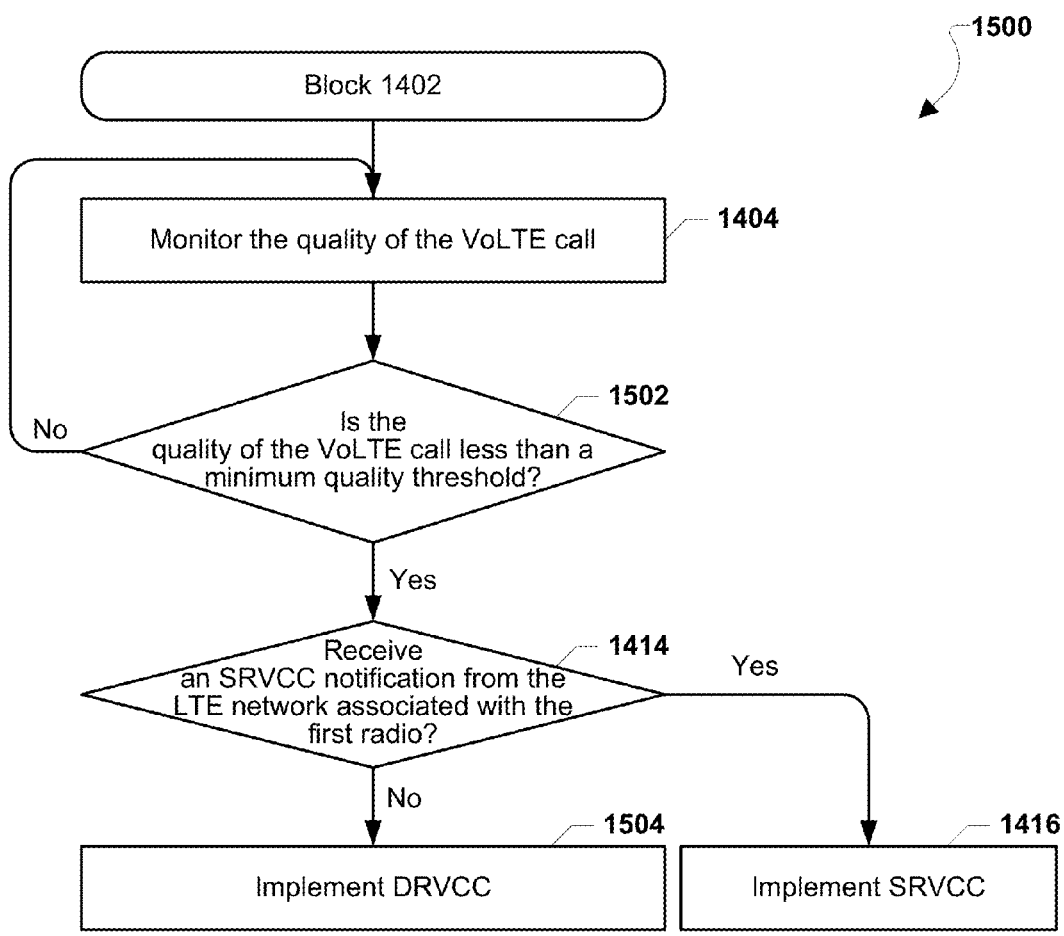
FIG. 15 is a processor flow diagram illustrating a method of implementing DRVCC on a multi-radio UE based on a quality of a VoLTE call on a first radio, according to various embodiments.

FIG. 15 illustrates a method 1500 for implementing UE-controlled DRVCC on a multi-radio UE according to some embodiments. The method 1500 may be implemented with a processor (e.g., the modem processor 210 of FIG. 2, the controller/processor 230, the controller/processor of FIG. 3, a separate controller, and/or the like) of a multi-radio UE (e.g., the multi-radio UE 110, 350 described with reference to FIGS. 1-8). The operations of the method 1500 implement some embodiments of the operations of the method 1400 (FIG. 14). With reference to FIGS. 1-15, the UE processor may begin performing the method 1500 in response to initiating a VoLTE call with an LTE network via the first radio in block 1402 of the method 1400.

Occasionally, the network handling a VoLTE call for a multi-radio UE may not send the multi-radio UE an SRVCC handover command before the quality of the VoLTE call has downgraded or before the VoLTE call has disconnected. To address this situation, in some embodiments, the UE processor may leverage the availability of multiple radios on the multi-radio UE to implement DRVCC in the event that network-implemented SRVCC is unavailable, not supported, or fails. In particular, the UE processor may independently observe the quality of VoLTE calls to determine whether there is a likelihood that the VoLTE call will be dropped (e.g., by monitoring for a certain drop in call quality) and may implement DRVCC in response to determining that the VoLTE call is at a particular risk of being dropped and that the multi-radio UE has not received a notification to begin performing SRVCC from the network handling the VoLTE call.

In block 1404, the UE processor may monitor the quality of the VoLTE call and may continue monitoring the quality of the VoLTE call in block 1404 as described with reference the method 1400 and determine whether the quality of the VoLTE call is less than a minimum quality threshold in determination block 1502. For example, the UE processor may take power measurements, signal strength measurements, etc. related to the VoLTE call, and may compare those measurements to a threshold value in memory. The UE processor may repeat the operations of blocks 1404 and 1502 so long as the quality of the VoLTE call is not less than a minimum quality threshold (i.e., while determination block 1502="No").

As described, the minimum quality threshold may represent the lowest call quality before the VoLTE call is at a certain risk of being dropped or downgraded. For example, as the multi-radio LTE moves farther away from a network capable of supporting the VoLTE call, the quality of the VoLTE call may gradually diminish due to reduced signal strength until the network is likely to drop the connection. In some embodiments of the operations performed in determination block 1502, the UE processor may determine whether the quality of the VoLTE call is less than the minimum quality threshold by determining whether a threshold number of voice packets has been received in a certain threshold period of time (e.g., n voice packets within t seconds). In such embodiments, the UE processor may determine that the quality of the VoLTE call is below the threshold in response to determining that the threshold number of voice packets has not been received within the threshold period of time.

In response to determining that the quality of the VoLTE call is less than the minimum quality threshold (i.e., determination block 1502="Yes"), the UE processor may determine whether an SRVCC notification from the LTE network associated with the first radio has been received in determination block 1414. As described with reference to the method 1400, the UE processor may expect to receive an SRVCC handover command to begin the processor of moving the VoLTE call from the LTE network to a legacy CS network. However, as described, the LTE network may occasionally fail to send an SRVCC handover command to the multi-radio UE in time to prevent the VoLTE call from being downgraded or dropped.

In some embodiments, the device processor may reactivate the second radio in the event the second radio was previously deactivated in response to determining that the quality of the VoLTE call is less than the minimum quality threshold (i.e., determination block 1502) in anticipation of implementing SRVCC operations. In other words, in response to determining that the VoLTE call is likely to be downgraded or dropped, the UE processor may preemptively reactivate the second radio so that the second radio is active and ready for use in implementing SRVCC if needed.

Thus, in response to determining that an SRVCC notification has been received from the LTE network associated with the first radio (i.e., determination block 1414="Yes"), the UE processor may implement SRVCC in block 1416 as described with reference to the method 1400.

In response to determining that an SRVCC notification has not been received from the LTE network (i.e., determination block 1414="No"), the UE processor may implement DRVCC in block 1504. In some embodiments, the LTE network may not support SRVCC operations and, thus, may not initiate SRVCC. As a result, the UE processor may implement DRVCC in order to prevent dropping the call despite the LTE network's lack of support for SRVCC.

In some embodiments of the operations performed in block 1504, the UE processor may implement DRVCC by initiating a CS call with a legacy CS network (e.g., a GSM network) with a session transfer number (STN). In some embodiments, the multi-radio UE may be preconfigured with the STN, and the UE processor may retrieve the STN from memory in the multi-radio UE. In some alternative (or additional) embodiments, the UE processor may have previously received the STN from the LTE network (or another network), such as by utilizing the Open Mobile Alliance Device Management (OMA DM) protocol.

In some embodiments of the operations performed in block 1504, the UE processor may continue receiving PS data services from the LTE network with the first radio after moving the call to the second radio, as described (see, e.g., FIG. 8). In such embodiments, the minimum quality threshold for the VoLTE call may be higher than a minimum quality threshold for typical PS data services (e.g., a data call). Thus, while the VoLTE call is moved to a CS network, the multi-radio UE may continue to receive data services from the LTE network via the first radio while the second radio supports the CS voice call on the CS network.

As a result of independently implementing DRVCC, the UE processor may reduce the likelihood that the VoLTE call will be dropped before the call can be switched to a CS network that may continue supporting the call.

In some embodiments of the operations performed in the method 1500, the multi-radio UE may be a single-radio UE. In such embodiments, a processor of the single-radio UE may monitor the quality of a VoLTE call supported by the single radio in block 1404. In some embodiments of the operations performed in determination block 1502, the processor of the single-radio UE may determine whether the quality of the VoLTE call is less than a minimum quality threshold, such as by determining whether the VoLTE call has been downgraded or disconnected or whether the single-radio UE is in LTE Radio Link Failure (RLF).

In some embodiments of the operations performed in block 1504, the processor of the single-radio UE may configure the single radio to reselect to a legacy CS network (e.g., a GSM network) and may initiate DRVCC operations on the CS network to continue the call. Specifically, the single-radio UE may perform DRVCC by calling an STN from a legacy CS network (e.g., GSM/cdma1x), which may cause the legacy CS network to link a CS call to the VoLTE call being handled by the LTE network. While multi-radio UEs may be able to communicate with the LTE network in order to actively release the VoLTE bearer, the single-radio UE may be unable to tune back to the LTE network after starting the CS voice call and, thus, the VoLTE bearer may be released due to a RLF with the LTE network. In other words, the single-radio UE may abruptly cease communications with the LTE network, which may cause the LTE network to determine that there has been an RLF and may cause the LTE network to end the VoLTE call.

In other embodiments in which the single-radio UE is a single-radio-LTE (SRLTE)/SLTE UE, the UE may not need to perform reselection as the UE may be able to initiate a CS call to a STN from the CS network cell directly. For example, the single-radio UE may be a multi-standby UE in which a subscription to the LTE network and a subscription to the legacy CS network may share the single radio to communicate with their respective networks at different times. Thus, in some embodiments, the processor of the single-radio UE may implement DRVCC in block 1504 by sharing the single radio between a subscription to the LTE network and a subscription to the legacy CS network. Specifically, the processor of the single-radio UE may initiate a tune away from the LTE subscription to the CS subscription (i.e., provide the shared radio to the CS subscription from the LTE subscription) to enable the CS subscription to begin DRVCC operations by calling an STN. In some embodiments, the processor of the single-radio UE may temporarily provide the shared radio to the LTE subscription to enable the LTE subscription to request release of the LTE bearer from the LTE network.

While some embodiments described with reference to FIGS. 1-15 refer to multi-radio UEs, various embodiments may be implemented with a UE with one radio or any number of radios. For example, various embodiments may be implemented with a dual-transmitter-dual-receiver UE, a single-transmitter-dual-receiver UE, and/or a single-transmitter-single-receiver UE.

As those skilled in the art will readily appreciate, various embodiments described throughout this disclosure may be extended to other telecommunication systems, network architectures and communication standards. By way of example, various embodiments may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various embodiments may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. A non-transitory computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in various embodiments presented throughout this disclosure, the memory may be internal to the processors (e.g., cache or register).

Non-transitory computer-readable media may be embodied in a computer-program product. By way of example, a computer-program product may include a non-transitory computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice various embodiments described herein. Various modifications to these embodiments will be readily apparent to those skilled in the art, and the generic principles defined herein may be applied to other embodiments. Thus, the claims are not intended to be limited to some embodiments shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communications by a user equipment (UE), comprising:
sending to a network associated with a first radio access technology (RAT) a measurement report, wherein the measurement report triggers a request for a handover of a voice over Internet protocol (VoIP) call from the network associated with the first RAT to a network associated with a second RAT;
receiving from the network associated with the first RAT a voice call continuity (VCC) required message subsequent to a rejection of the request for the handover by the network associated with the first RAT;
sending a circuit-switched (CS) call setup message to the network associated with the second RAT;
continuing the VoIP call as a voice call on a CS domain of the network associated with the second RAT;
communicating data for applications other than the VoIP call via the network associated with the first RAT;
determining whether dual transmission mode (DTM) is supported by the UE or the network associated with the second RAT;
after performing single radio voice call continuity, initiating a Tracking Area Update on the first RAT to resume PS service in response to determining that DTM is not supported by the UE or the network associated with the second RAT; and
transferring a PS domain back to the first RAT in response to determining that DTM is supported by both the UE and the network associated with the second RAT.

2. The method of claim 1, further comprising:
resuming or continuing packet-switched (PS) services via the network associated with the first RAT.

3. The method of claim 1, further comprising:
handing over the VoIP call from the network associated with the first RAT to the CS domain of the network associated with the second RAT without disconnecting from the network associated with the first RAT.

4. The method of claim 1, wherein:
the UE comprises two or more radios; and the method further comprises:
activating a deactivated radio of the second RAT.

5. The method of claim 1, further comprising:
sending an indication of network-controlled dual radio voice call continuity (DRVCC) capability.

6. The method of claim 5, wherein:
the VCC required message comprises a command from the network associated with the first RAT to perform DRVCC;
sending the CS call setup message to the network associated with the second RAT comprises requesting a new CS connection via the network associated with the second RAT to perform DRVCC; and
wherein the method further comprises:
receiving a bearer deactivation request for the VoIP call on the network associated with the first RAT.

7. The method of claim 6, wherein an indication of network-controlled DRVCC capability is delivered to a mobility management entity (MME), and the command to perform DRVCC originates in the MME.

8. The method of claim 6, wherein:
an indication of network-controlled DRVCC capability is delivered to a base station; and
the command to perform DRVCC originates in the base station.

9. The method of claim 5, further comprising:
receiving an indication to handover to the network of the second RAT, wherein the indication further indicates that the UE should maintain a connection to the network of the first RAT.

10. The method of claim 1, further comprising:
determining whether the network associated with the first RAT supports voice-over-LTE (VoLTE) calls; and
deactivating a radio of the UE that supports communication with the network associated with the second RAT in response to determining that the network associated with the first RAT supports VoLTE calls.

11. The method of claim 10, wherein:
determining whether the network associated with the first RAT supports VoLTE calls comprises determining whether one or more conditions is satisfied, the conditions comprising:
a radio of the first RAT has successfully performed a Session Initiation Protocol registration to an Internet Protocol Multimedia Subsystem (IMS) of the network associated with the first RAT;
the network of the first RAT supports at least one of Short-Message-Service (SMS) over IMS and SMS over an SGs interface; and
the network associated with the first RAT supports circuit-switch-fall-back operations; and wherein
deactivating a radio of the UE that supports communication with the network associated with the second RAT in response to determining that the network associated the first RAT supports VoLTE calls comprises deactivating the radio of the second RAT in response to determining that at least one of the conditions is satisfied.

12. The method of claim 1, further comprising:
determining whether a quality of the VoIP call satisfies a minimum quality threshold;
deactivating the radio of the second RAT in response to determining that the quality of the VoIP call satisfies the minimum quality threshold; and
activating the radio of the second RAT in response to determining that the quality of the VoIP call does not satisfy the minimum quality threshold.

13. The method of claim 1, further comprising:
determining whether the VoIP call is likely to be at least one of downgraded and dropped;
determining whether the network associated with the first RAT has initiated single radio voice call continuity (SRVCC) for the UE; and
implementing dual radio voice call continuity (DRVCC) in response to determining that the VoIP call is likely to be at least one of downgraded and dropped and in response to determining that the network associated with the first RAT has not initiated SRVCC.

14. A method for wireless communications by a mobility management entity, comprising:
receiving an indication that a user equipment (UE) has network controlled dual radio voice call continuity (DRVCC) capability;
receiving a request to handover a voice call for the UE from a first radio access technology (RAT) network to a second RAT network;
sending a handover preparation failure message to instruct the UE to perform DRVCC; and
not releasing an S1 connection after the handover.

15. The method of claim 14, wherein the indication that the UE has network-controlled DRVCC is received from a base station.

16. The method of claim 14, wherein the indication that the UE has network-controlled DRVCC is received from the UE.

17. A method for wireless communications by a user equipment (UE), comprising:
determining whether a network associated with a first radio access technology (RAT) supports voice-over-LTE (VoLTE) calls;
deactivating a radio of the UE that supports communication with a network associated with a second RAT in response to determining that the network associated with the first RAT supports VoLTE calls;
sending to the network associated with the first RAT a measurement report, wherein the measurement report triggers a request for a handover of a voice over Internet protocol (VoIP) call from the network associated with the first RAT to the network associated with the second RAT;
receiving from the network associated with the first RAT a voice call continuity (VCC) required message subsequent to a rejection of the request for the handover by the network associated with the first RAT;
sending a circuit-switched (CS) call setup message to the network associated with the second RAT;
continuing the VoIP call as a voice call on a CS domain of the network associated with the second RAT; and
communicating data for applications other than the VoIP call via the network associated with the first RAT.

18. A method for wireless communications by a user equipment (UE), comprising:
determining whether the VoIP call is likely to be at least one of downgraded and dropped;
sending to a network associated with a first radio access technology (RAT) a measurement report, wherein the measurement report triggers a request for a handover of a voice over Internet protocol (VoIP) call from the network associated with the first RAT to a network associated with a second RAT;
receiving from the network associated with the first RAT a voice call continuity (VCC) required message subsequent to a rejection of the request for the handover by the network associated with the first RAT;
determining whether the network associated with the first RAT has initiated single radio voice call continuity (SRVCC) for the UE;
implementing dual radio voice call continuity (DRVCC) in response to determining that the VoIP call is likely to be at least one of downgraded and dropped and in response to determining that the network associated with the first RAT has not initiated SRVCC;
sending a circuit-switched (CS) call setup message to the network associated with the second RAT;
continuing the VoIP call as a voice call on a CS domain of the network associated with the second RAT; and
communicating data for applications other than the VoIP call via the network associated with the first RAT.

* * * * *